United States Patent [19]
Nakamura et al.

[11] Patent Number: 5,882,089
[45] Date of Patent: Mar. 16, 1999

[54] HYDRAULIC BRAKE SYSTEM FOR CONTROLLING FLUID FLOW TO A WHEEL CYLINDER

[75] Inventors: Kiyoharu Nakamura; Fumiaki Kawahata, both of Toyota; Masashi Ito, Seto, all of Japan

[73] Assignee: Toyota Jidosha Kabushiki Kaisha, Toyota, Japan

[21] Appl. No.: 677,736

[22] Filed: Jul. 10, 1996

[30] Foreign Application Priority Data

Jul. 10, 1995 [JP] Japan ..................... 7-173778

[51] Int. Cl.⁶ ..................... B60T 13/18
[52] U.S. Cl. ..................... 303/10; 303/DIG. 10; 303/900; 303/11
[58] Field of Search ............. 417/222.1, 222.2, 417/489; 137/505.13; 303/3, 10, 11, 113.1, 113.2, 115.1, 115.2, 115.4, 116.1, 116.2, 116.4, 117.1, 900, DIG. 10

[56] References Cited

U.S. PATENT DOCUMENTS

| | | | |
|---|---|---|---|
| 3,275,027 | 9/1966 | Wilson | 137/489 |
| 5,002,344 | 3/1991 | Hashida | 303/117.1 |
| 5,026,123 | 6/1991 | Nobuto et al. | 303/117.1 |
| 5,295,796 | 3/1994 | Goto et al. | 417/222.2 |
| 5,397,175 | 3/1995 | Matsunaga et al. | 303/117.1 |

FOREIGN PATENT DOCUMENTS

| | | | |
|---|---|---|---|
| 4028552 | 3/1992 | Germany | 303/113.2 |
| 63-158422 | 10/1988 | Japan . | |
| 6-344894 | 12/1994 | Japan . | |
| 2236564 | 4/1991 | United Kingdom | 303/116.1 |

*Primary Examiner*—Chris Schwartz
*Attorney, Agent, or Firm*—Pillsbury Madison & Sutro LLP

[57] ABSTRACT

A hydraulic brake system is provided which does not need a mechanism to feed back the wheel cylinder pressure. The hydraulic brake system generates a brake force by supplying the brake fluid to a wheel cylinder under a high pressure generated by a high pressure source. The brake fluid is supplied to the high pressure source from a reservoir tank storing the brake fluid under atmospheric pressure. A fluid passage connects the high pressure source to both the wheel cylinder and the reservoir tank. An amount of the brake fluid flowing from the high pressure source to the wheel cylinder is controlled by a constant flow valve.

12 Claims, 18 Drawing Sheets though the hydraulic brake system described in the above-mentioned patent application has a spool valve which selectively connects one of the hydraulic pump and the reservoir tank to the wheel cylinder...

HYDRAULIC BRAKE SYSTEM FOR CONTROLLING FLUID FLOW TO A WHEEL CYLINDER

BACKGROUND OF THE INVENTION

1. Field of the Invention

The present invention generally relates to a hydraulic brake system and, more particularly, to an automobile hydraulic brake system which gene rates a brake force by introducing fluid pressure generated by a high pressure source into a wheel cylinder.

2. Description of the Related Art

A conventional hydraulic brake system is described in Japanese Laid-Open Patent Application No.6-344894 which generates a desired brake force by introducing a hydraulic pressure generated by a hydraulic pump into a wheel cylinder when a brake pedal is operated. The hydraulic pressure introduced into the wheel cylinder is responsive to a force applied to the brake pedal.

In a hydraulic brake system of this type, since the hydraulic pressure introduced into the wheel cylinder is generated by the hydraulic pump, a large brake force can be obtained by applying only a small force to the brake pedal. Accordingly, a brake system having such a hydraulic brake provides a good brake feeling.

The hydraulic brake system described in the above-mentioned patent application has a spool valve which selectively connects one of the hydraulic pump and the reservoir tank to the wheel cylinder. One end of the spool valve is provided with a first pressure receiving surface onto which a master cylinder pressure generated by the master cylinder is applied. Thus, a force equal to a multiplication of the master cylinder pressure and the pressure reviving area of the first pressure receiving surface is applied to the spool valve. This force is hereinafter referred to as a spool valve driving force. The other end of the spool valve is provided with a second pressure receiving surface onto which a wheel cylinder pressure generated by the wheel cylinder is applied. Thus, a force equal to a multiplication of the wheel cylinder pressure and the pressure receiving area of the second pressure receiving surface is applied to the spool valve. This force is hereinafter referred to as a feedback driving force. When the spool valve driving force is greater than the feedback driving force, the spool valve is moved in a direction where the hydraulic pump is connected to the wheel cylinder. Or the other hand, when the spool valve driving force is less than the feedback driving force, the spool valve is moved in a direction where the reservoir tank is connected to the wheel cylinder.

According to the above-mentioned structure, when the spool valve driving force is greater than the feedback driving force, the wheel cylinder is connected to the hydraulic pump until the feedback driving force becomes equal to the spool valve driving force. On the other hand, when the feedback driving force is greater than the spool valve driving force, the wheel cylinder is connected to the reservoir tank until the feedback driving force becomes equal to the spool valve driving force. In this case, the feedback driving force accurately balances with the spool valve driving force. Thus, according to the above-mentioned hydraulic brake system, a precisely controlled pressure, which is responsive to a force applied by an operator and supplied to the wheel cylinder, can be generated by using the hydraulic pump as a high pressure source.

However, since one of the hydraulic cylinder and the reservoir tank is selectively connected to the wheel cylinder, the wheel cylinder pressure is continuously increased while the connection between the hydraulic pump and the wheel cylinder is selected. Thus, it is required to interrupt the connection between the wheel cylinder and the hydraulic pump, when the wheel cylinder pressure reaches a predetermined pressure relative to the master cylinder pressure, by applying to the spool valve the feedback driving force which is against the spool valve driving force generated by the master cylinder pressure. That is, a mechanism is needed to apply the wheel cylinder pressure to the spool valve as the feedback driving force which is against the spool valve driving force. In this respect, the above-mentioned conventional hydraulic brake system has room for improvement in that a complex mechanism is needed to control the wheel cylinder pressure.

SUMMARY OF THE INVENTION

It is a general object of the present invention to provide an improved and useful hydraulic brake system.

A more specific object of the present invention is to provide a hydraulic brake system which does not need a mechanism to feed back the wheel cylinder pressure due to controlling a flow of brake fluid from a high pressure source to the wheel cylinder when a high pressure source is connected to both of the wheel cylinder and the reservoir tank.

In order to achieve the above-mentioned objects, there is provided according to the present invention, as illustrated in FIG. 1, a hydraulic brake system for generating a brake force by supplying brake fluid to a wheel cylinder (P12) under a high pressure generated by a high pressure source (P10), the hydraulic brake system comprising:

a reservoir tank (P14) storing the brake fluid under atmospheric pressure, a fluid passage (P16) connecting the high pressure source (P10) to both of the wheel cylinder (P12) and the reservoir tank (P14); and flow control means (P18) for controlling an amount of the brake fluid flowing from the high pressure source (P10) to the wheel cylinder (P12).

In the above-mentioned invention, the high pressure source (P10) is connected to the reservoir tank (P14) as well as the wheel cylinder (P12). Thus, the brake fluid discharged from the high pressure source (P10) and flows to the wheel cylinder (P12) and the reservoir tank (P14) via the fluid passage (P16). The amount of the brake fluid flowing from the high pressure source (P10) to the wheel cylinder (P12) is controlled by the flow control means (P18). Flow control means (P18) comprises a variable volume pump as shown in FIG. 13, or may comprise a variable orifice as shown in FIG. 15. The pressure in the wheel cylinder (12) increases as the amount of the brake fluid flowing into the wheel cylinder (P12) is increased. On the other hand, the amount of the brake fluid flowing from the high pressure source (P10) to the reservoir tank (P14) increases as the pressure in the wheel cylinder (P12) is increased. After the pressure in the wheel cylinder (P12) has reached a pressure controlled by the fluid control means (P18), the whole amount of the brake fluid discharged by the high pressure source (P10) flows to the reservoir tank (P14). At the same time a brake force corresponding to the pressure in the wheel cylinder (P12) is generated. Thus, the brake force generated by the wheel cylinder (P12) is controlled by the flow control means (P18). Accordingly, the hydraulic brake system of the present invention has a simple construction without a feedback mechanism for the pressure in the wheel cylinder, and a precisely controlled brake force corresponding to an operational force applied to a brake can be generated.

The hydraulic brake system of the present invention may further comprise, as illustrated in FIG. 2:

brake means (P20) for generating a predetermined force corresponding to an operational force applied thereto;

a first opening/closing valve (P24) provided in a part (P22) of the fluid passage (P16) between the high pressure source (P10) and the wheel cylinder (P12) to close the part (P22) of the fluid passage (P16) when the operational force applied to the brake means (P20) is less than a predetermined value;

a pressure release passage (P26) connecting the wheel cylinder (P12) to the reservoir tank (P14); and a second opening/closing valve (P28) provided in the pressure release passage (P26) to open he pressure release passage (P26) when the operational force applied to the brake means (P20) is less than a predetermined value.

According to this invention, when the operational force applied to the brake means (P20) is less than the predetermined value, the first opening/closing valve (P24) closes the part (P22) of the fluid passage (P16) and second opening/closing valve (P28) opens the pressure release passage (P26). Thus, the flow of the brake fluid from the high pressure source (P10) to the wheel cylinder (P12) is stopped, and the flow from the high pressure source (P10) to the reservoir tank (P14) is permitted. In this condition, occurrence of brake drag is prevented since the pressure in the wheel cylinder is maintained at atmospheric pressure. The brake means P20 includes a master cylinder (not shown) which provides fluid flow (not shown) to the wheel cylinder P12 when opening/closing valve P24 is closed. On the other hand, when the operational force applied to the brake means (P20) exceeds the predetermined value, a par (P22) of the fluid passage (P16) is opened by the first opening/closing valve (P24) and the pressure release passage (P26) is closed by the second opening/closing valve (P28). In this condition, the wheel cylinder (P12) is connected to the high pressure source (P10) so as to generate an appropriate brake force controlled by the flow control means (P18).

In the hydraulic brake system of the present invention, as illustrated in FIG. 3, the high pressure source (P10) may comprise a variable volume pump (P30), and the flow control means (P18) comprises variable volume control means for controlling an output volume from the variable volume pump (P30).

In this invention, the amount of brake fluid flowing to the wheel cylinder (P12) is increased when the amount of brake fluid discharged by the variable volume pump (P30) is increased. On the other hand, the amount of brake fluid flowing to the wheel cylinder (P12) is decreased when the amount of brake fluid discharged by the variable volume pump (P30) is decreased. Thus, an appropriate amount of the brake fluid can be supplied to the wheel cylinder (P12) by controlling the output volume of the variable volume pump (P30), resulting in a desired brake force being generated. Energy input to the variable volume pump (P30) is decreased as the output of the variable volume pump (P30) is decreased. Thus, if the output volume of the variable volume pump (P30) is decreased when a required brake force is small, energy is not wasted especially when the brake is not actuated. Accordingly, the hydraulic brake system of this invention can reduce energy consumption.

Additionally, in the hydraulic brake system according to the present invention, as illustrated in FIG. 4, the fluid passage (P16) may comprise, high pressure source passage (P32) connected to the high pressure source (P10), a wheel cylinder passage (P34) connecting the high pressure source passage (P32) to the wheel cylinder (P12) and a reservoir passage (P36) connecting the high pressure source passage (P32) to the reservoir tank (P14), and wherein the flow control means (P18) comprises a variable throttle (P38) provided in the reservoir passage (P26).

In this invention, the brake fluid discharged from the high pressure source (P10) flows through the high pressure source passage (P32) and flows into both of the wheel cylinder (P12) and reservoir tank (P14) via the wheel cylinder passage (P34) and the reservoir passage (P36), respectively. The amount of brake fluid flowing to the wheel cylinder (P12) is increased as flow resistance of the reservoir passage (P36) is increased, and is decreased as the flow resistance of the reservoir passage (P36) is decreased. In this invention, the flow resistance of the reservoir passage (P36) is determined by the effective opening area of the variable throttle (P38). Accordingly, a desired brake force can be generated by controlling the effective opening area of the throttle (P38) to supply an appropriate amount of brake fluid to the wheel cylinder (P12). The control of the variable throttle can be achieved by a known technique in the art. Thus, the hydraulic brake system according to this invention can easily and precisely control the brake force generated by the wheel cylinder (P12).

Additionally, the hydraulic brake system according to the present invention may further comprise, as illustrated in FIG. 5:

a master cylinder (P40) generating a fluid pressure corresponding to an operational force applied to a brake;

a master cylinder passage (P42) connecting the master cylinder (P40) to the wheel cylinder (P12); and an opening/closing valve (P44) provided in the master cylinder passage (P42) to open the mater cylinder passage (P42) when the high pressure generated by the high pressure source (P10) is less than a predetermined pressure.

In this invention, the master cylinder (P40) generates a pressure (a master cylinder pressure) corresponding to the operational force applied to the brake. The master cylinder pressure is introduced into the master cylinder passage (P42) which is connected to the wheel cylinder (P12). The master cylinder passage (P42) is closed by the third opening/closing valve (P44) when the high pressure generated by the high pressure source (P10) exceeds the predetermined value. In this condition, the master cylinder pressure is not supplied to the wheel cylinder (P12). On the other hand, when the high pressure source (P10) generates a pressure less than the predetermined value, the third opening/closing valve (P44) opens the master cylinder passage (P42). In this condition, the master cylinder pressure is supplied to the wheel cylinder (P12). Accordingly, when the high pressure source (P10) does not generate a normal high pressure, the master cylinder pressure is supplied to the wheel cylinder (P12). Accordingly, the master cylinder pressure is supplied to the wheel cylinder (P12) so as to generate a brake force even when a malfunction occurs in the high pressure source (P10).

Additionally, the hydraulic brake system according to the present invention may further comprise, as illustrated in FIG. 6;

a master cylinder (40) generating a fluid pressure corresponding to an operational force applied to a brake;

a master cylinder passage (P42) connecting the master cylinder (P40) to the wheel cylinder (P12); and a check valve (P46) provided in the master cylinder passage to permit a flow of the brake fluid only in a direction from the master cylinder (P40) to the wheel cylinder (P12).

In this invention, the master cylinder pressure is supplied to the check valve (P46) in a normal direction, and the wheel cylinder pressure is applied to the check valve (P46) in a reverse direction. When the high pressure source (P10) is generating a normal high pressure, the high pressure is supplied to the wheel cylinder (P12) when the brake is actuated. If the wheel cylinder pressure is higher than the master cylinder pressure, the check valve (P46) does not open. However, if the high pressure source (P10) does not generate a normal high pressure, that is, if the master cylinder pressure is higher than the wheel cylinder pressure, the check valve (P46) is opened and the master cylinder pressure is supplied to the wheel cylinder (P12). Accordingly, in the hydraulic brake system of the present invention, the master cylinder pressure is supplied to the wheel cylinder (P12) so as to generate a brake force even when a malfunction occurs in the high pressure source (P10).

Additionally, the hydraulic brake system shown in FIG. 4 may further comprise, as illustrate in FIG. 7, a master cylinder (P40) generating a fluid pressure corresponding to an operational force applied to a brake, wherein the variable throttle comprises a spool valve (P38) for decreasing an amount of the brake fluid flowing in the reservoir passage (P36) as the fluid pressure generated by said master cylinder is increased.

In this invention, the variable throttle comprises the spool valve (P38) which decreases the flow of the brake fluid flowing in the reservoir passage (P36) as the master cylinder pressure is increased. In this case, a brake force corresponding to the operational force applied to the brake can be realized by a mechanical construction in which the spool valve (P38) and the master cylinder (P40) are connected to each other. Accordingly, in the present invention, a hydraulic brake system generating a precisely controlled brake force can be realized with a simple construction.

Additionally, in the hydraulic brake system shown in FIG. 4, as illustrated in FIG. 8, the variable throttle (P38) comprises an effective opening area varied by an external input and adjust means (P50) for adjusting the effective opening area based on a predetermined brake force control.

In this invention, the adjust means (P50) adjusts the effective opening area of the variable throttle (P38). The brake force generated by the wheel cylinder (P12) varies in response to the effective opening area of the variable throttle (P38). Accordingly the wheel cylinder (P12) can generate a brake force controlled by a predetermined brake force control logic known in the art such as an antilock brake system or a traction control system.

Additionally, the hydraulic brake system shown in FIG. 4 may further comprise, as illustrate in FIG. 9, constant flow means (P52) for maintaining a constant flow rate of the brake fluid flowing in the high pressure source passage (P32).

In this invention, the constant flow means (P52) maintains the flow rate of the brake fluid flowing in the high pressure source passage (P32). The wheel cylinder pressure is determined by the effective opening area of the variable throttle (P38) and the amount of brake fluid flowing in the high pressure source passage (P32). Thus, when the flow rate in the high pressure source passage (P32) is maintained to be constant, a pressure precisely corresponding to the effective opening area of the variable throttle (P38) is generated. Accordingly, the hydraulic brake system according to this invention can precisely controls a brake force by controlling the effective opening area of the variable throttle (P38).

Additionally, the hydraulic brake systems shown in FIGS. 5 and 6 may further comprise, as illustrated in FIG. 10, an opening/closing valve (P56) provided in the reservoir passage (P36) to close the reservoir passage (P36) when the high pressure generated by the high pressure source (P10) is less than a predetermined pressure.

In this invention, when the high pressure source (P10) is generating a normal high pressure, the fourth opening/closing valve (P56) opens the reservoir passage (P36). In this state, since the wheel cylinder (P12) connects to the reservoir tank (P14), no residual pressure remains in the wheel cylinder (P12). On the other hand, the fourth opening/closing valve (P56) closes the reservoir passage (P36) when the pressure generated by the high pressure source (P10) is less than a predetermined value. In this condition, a pressure can be supplied to the wheel cylinder (P12) from the master cylinder (P40). Accordingly, if a malfunction occurs in the high pressure source (P10), a pressure can be supplied from the master cylinder (P40) to the wheel cylinder (P12) to positively and effectively pressurize the wheel cylinder (P12).

Other objects, features and advantages of the present invention will become more apparent from the following detailed description when read in conjunction with the accompanying drawings.

DETAILED DESCRIPTION OF THE PREFERRED EMBODIMENTS

Figure 11:
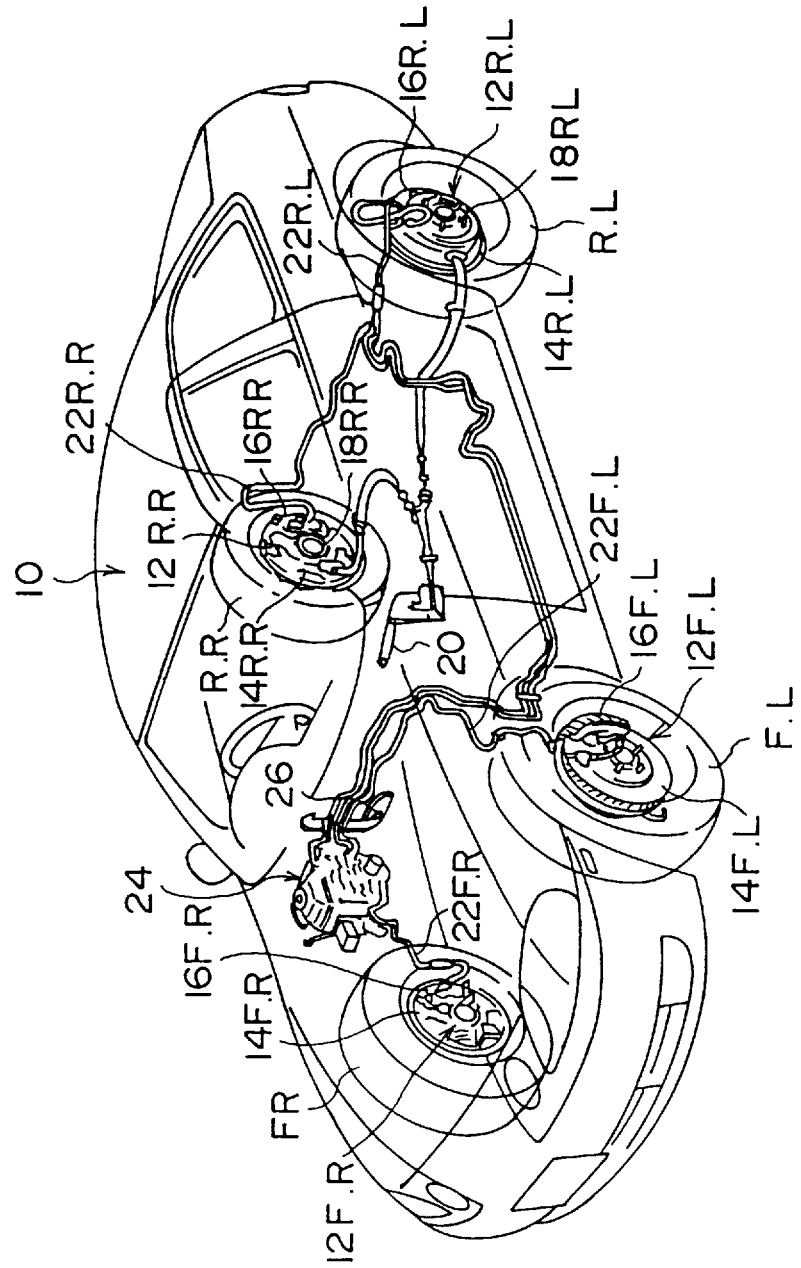
FIG. 11 is a perspective view of a vehicle which is equipped with a hydraulic brake system according to a first embodiment of the present invention.

A description will now be given, with reference to FIGS. 11 to 16, of a first embodiment of a present invention. FIG. 11 is a perspective view of a vehicle 10 which is equipped with a hydraulic brake system according to the first embodiment of the present invention. The vehicle 10 has left and right front wheels FL and FR and left and right rear wheels RL and RR. The wheels FL, FR, RL and RR are provided with disk brakes 12F, 12FR, 12RL and 12RR, respectively.

The disk brakes 12FL and 12FR provided in the left and right front wheels FL and FR have disk rotors 14FL and 14FR and wheel cylinders 16FL and 16FR, respectively. The disk rotors 14FL and 14FR rotate with the respective wheels. The wheel cylinders 16FL and 16FR applies a supplied brake torque corresponding to a brake fluid pressure to the respective disk rotors 16FL and 16FR.

The disk brakes 12RL and 12RR provided in the left and right rear wheels RL and RR have disk rotors 14RL and 14RR and wheel cylinders 16RL and 16RR, respectively. The disk rotors 14RL and 14RR rotate with the respective wheels. The wheel cylinders 16RL and 16RR applies a brake torque corresponding to a supplied brake fluid pressure to the respective disk rotors 16FL and 16FR. Additionally, the disk rotors 14RL and 14RR are provided with parking brakes 18RL and 18RR, respectively. The parking brakes 18RL and 18RR generate a brake force when a parking brake lever 20 is pulled or actuated.

The above-mentioned wheel cylinders 16F, 16FR, 16RL and 16RR are connected to a hydraulic booster actuator 24 via respective brake conduits 22FL, 22RL, 22RL and 22RR. The hydraulic booster actuator 24 supplies a hydraulic pressure responsive to an operational force applied to a brake pedal 26. The hydraulic brake system according to the present embodiment generally comprises the hydraulic booster actuator 24 and the wheel cylinders 16FL, 16FR, 16RL and 16RR, and particularly relates to a structure of the hydraulic booster actuator 24.

Figure 12:
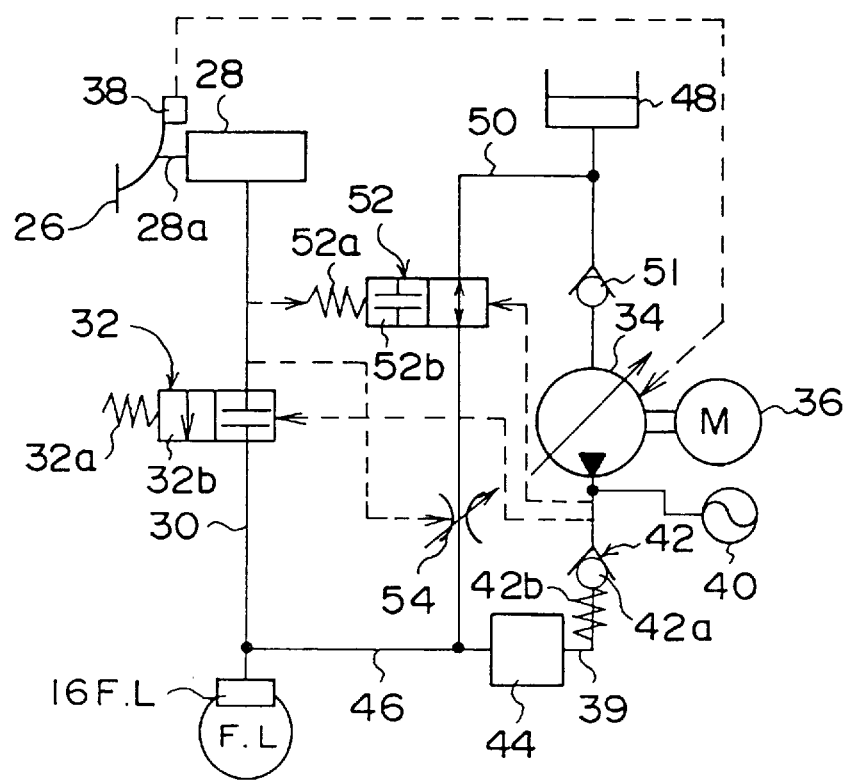
FIG. 12 is a hydraulic circuit diagram for a hydraulic circuit formed by a hydraulic booster actuator and one of the wheel cylinders shown in FIG. 1.

FIG. 12 is a hydraulic circuit diagram of a hydraulic circuit formed by the hydraulic booster actuator 24 and the wheel cylinder 16FL. Although hydraulic circuits corresponding to other wheel cylinders 16FR, 16RL and 16RR are formed in the hydraulic booster actuator 24, a description will be given of the hydraulic circuit correspond to the wheel cylinder 16FR for the sake of convenience because the construction of other hydraulic circuits are similar to each other.

As shown in FIG. 12, the brake pedal 26 is connected to an input shaft 28a of a master cylinder 28. The master cylinder 28 converts a thrust force applied to the input shaft 28a into a hydraulic pressure. Thus, when an operational force is applied to the brake pedal 26, the master cylinder 28 generates a brake fluid pressure corresponding to the operational force.

The master cylinder 28 is connected to the wheel cylinder 16FL via a master cylinder passage 30. A first opening/closing valve 30 is provided in the middle of the master cylinder passage 30. The first opening/closing valve 32 has a valve member 32b having a first end to which a pressing force is applied by a spring 32a and a second end to which a discharge pressure of a variable volume pump 34 is applied. When the valve member 32b is displaced in a direction where the pressing force by the spring 32a is applied (rightward in FIG. 12) the master cylinder passage 30 is open. The master cylinder passage 30 is open when the operational force applied to the brake means is less than the predetermined value. When the operational force is above a predetermined value, the hydraulic fluid flows to the wheel cylinder directly from the variable volume pump 34. The operational force is provided to the variable volume pump as illustrated by the dotted line as shown in FIG. 12. When the valve member 32b is displaced in a direction where the discharge pressure of the variable volume pump 34 is applied (leftward in FIG. 12), the master cylinder passage 30 is shut.

In the present embodiment, the spring 2 is designed so as to satisfy the conditions where the first opening/closing valve 32 is closed when the variable volume pump 34 is generating an appropriate discharge pressure, and the first opening/closing valve 32 is open when the variable volume pump 34 is not generating an appropriate discharge pressure. Accordingly, the master cylinder passage 30 is open when the variable volume pump 34 is generating a normal discharge pressure, and is closed when the variable volume pump 34 is not generating a normal discharge pressure.

Figure 13:
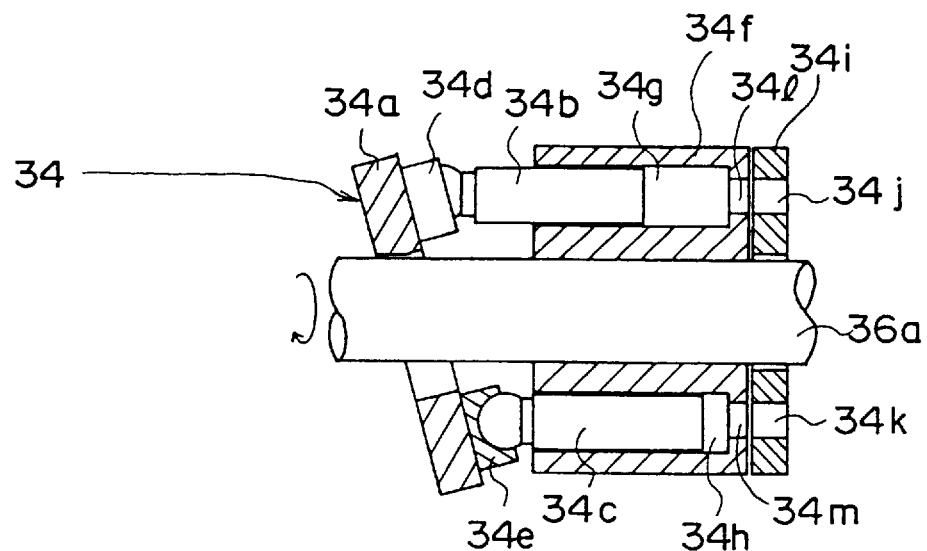
FIG. 13 is a cross-sectional view of a variable volume pump shown in FIG. 12.

The variable volume pump 34 is a pump which pressurizes and delivers a fluid by using a motor as a I driving source. As shown in FIG. 13, the variable volume pump 34 comprises a swash plate 34a which rotates while maintaining a predetermined angle to a rotational shaft 36a of the motor 36. The swash plate 34a is connected with pistons 34b and 34c via ball joints 34d and 34e, respectively. The pistons 34b and 34c are slidably and sealingly inserted into respective cylinders 34g and 34h formed in a cylinder block 34f.

In the above mentioned structure of the variable volume pump 34, the pistons 34b and 34c reciprocate in the respective cylinders 34g and 34h as the rotational shaft 36a of the motor 36 is rotated. The stroke of each of the pistons 34b and 34c is determined by an angle of the swash plate 34a.

The cylinder block 34f is provided with through holes 34l and 34m which connect the cylinder 34g and 34h to an inlet port 34j or an outlet port 34k of a valve plate 34i. The valve plate 34i is not rotated by the rotational shaft 36a. The inlet port 34j an the outlet port 34k are elongated openings having a predetermined radius of curvature. The inlet port 34j connects to the through holes 34l and 34m when the pistons 34b and 34c are moved in the direction where the pistons 34b and 34c are pulled out from the respective cylinders 34g and 34h. The outlet port 34k connects to the through holes 34l and 34m when the pistons 34b and 34c are moved in the direction where the pistons 34b and 34c are pushed into the respective cylinders 34g and 34h.

In the above-mentioned structure of the variable volume pump 34, when the pistons 34b and 34c reciprocate in the respective cylinders 34g and 34h with a predetermined travel, a predetermined amount of fluid, which corresponds to the travel of the pistons 34g and 34h, is suctioned through the inlet port 34j and discharged through the outlet port 34k. Since the travel of the pistons 34b and 34c is determined by the angle of the swash plate 34a, the flow of the fluid discharged from the outlet port 34k per revolution of the rotational shaft 36a is determined by the angle of the swash plate 34a.

The variable volume pump 34 has a mechanism to change the angle of the swash plate 34a. In the present embodiment, a two-step changing mechanism is used in which the angle of the swash plate 34a is changed stepwise in increments of two degrees. The change of the angle of the swash plate 34a is not limited to the stepwise change, and the angle may be continuously or linearly changed. Additionally, as shown in FIG. 12, the variable volume pump 34 is connected with a brake switch 38 which detects an operational state of the brake pedal 26. That is, when the motion of the brake pedal 26 is detected by the brake switch 38, the angle of the swash plate 34a is increased.

Accordingly, in the hydraulic brake system according to the present embodiment, the variable volume pump 34 discharges a small amount of flow when the brake pedal 26 is not depressed, whereas a large amount of flow is discharged when the brake pedal 26 is depressed.

The variable volume pump 34 acts as a high pressure source for supplying a brake fluid pressure to the wheel cylinder 16FL. Thus, a large amount of flow is not required for the variable volume pump 34 when a braking operation is not performed. In this respect, the variable volume pump 34 having the above-mentioned structure in which the amount of flow is changeable allows a sufficient amount of flow to be maintained when a brake operation is performed while maintaining driving energy at a minimum when a brake operation is not performed.

As shown in FIG. 12, the discharge side of the variable volume pump 34 is connected to a high pressure source passage 39. The high pressure source passage 39 is connected with an accumulator 40. Additionally, a check valve 42 is provided on the downstream side of the accumulator 40. The check valve 42, permits a flow in the direction from the variable volume pump 34 to the wheel cylinder 16FL. The check valve 42 comprises a spring 42b which presses a ball valve 42a in a closing direction. Thus, the check valve has an opening pressure which corresponds to a pressing force generated by the spring 42b. In this structure, a residual pressure is accumulated in a part of the high pressure source passage 39 from a variable volume pump 34 to the check valve 42 as well as in the accumulator 40.

Figure 14:
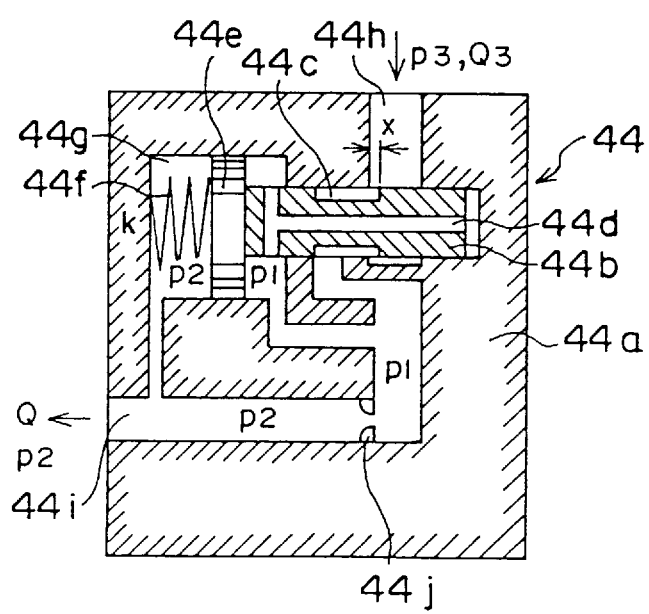
FIG. 14 is a cross-sectional view of a constant flow valve shown in FIG. 12.

On the downstream side of the check vale 42 in the high pressure source passage 39, a constant flow valve 44 is provided. The constant flow valve 44 comprises a spool valve 44b which is slidable in a housing 44a in a direction of the longitudinal axis as shown in FIG. 14. The spool valve 44b has an annular groove 44c along an outer surface thereof, and a fluid pressure introducing passage 44d inside thereof. The fluid pressure introducing passage 44d opens at one end of the spool valve 44b (the right side in FIG. 14) and opens on a side surface of the spool valve 44b near the opposite end.

A space 44g is formed interiorly of the housing 44a for accommodating a piston 44e and a spring 44f which urges the piston 44e in addition to a space or accommodating the spool valve 44b. The piston 44 contacts the end of the spool valve 44b, and slides in the space 44g. The opening of the fluid pressure introducing passage 44d on the side surface opens in the space 44g.

A fluid inflow passage 44h and a fluid outflow passage 44c are also formed in the housing 44a. The fluid inflow passage 44h connects to the high pressure source passage 39. The fluid outflow passage 44i connects to a wheel cylinder passage 46. The fluid inflow passage 44h overlaps with the annular groove 44c by a predetermined length when the spool valve 44b is positioned at the leftmost position in FIG. 14. On the other hand, the fluid inflow passage 44n overlaps with the annular groove 44c irrespective of the position of the spool valve 44b. The inflow passage 44n has a throttle 44j. The fluid inflow passage 44n connects to the right side of the piston 44e on the upstream side of the throttle 44j, an connects to the left side of the piston 44e on the downstream side of the piston 44e.

In the above-mentioned structure, when fluid enters into the fluid inflow passage 44h, the fluid flows into the fluid outflow passage 44i via the angular groove 44c of the spool valve 44b. This flow of the fluid causes a pressure difference in the fluid inflow passage between the upstream side and the downstream side with respect to the throttle 44j due to a throttling action of the throttle 44j. A thrust force from right to left in FIG. 14 is exerted on the spool valve 44b and the piton 44e due to a pressure P1, where P1 is a pressure on he upstream side of the throttle 44j. On the other hand a thrust force from left to right in FIG. 14 is exerted on the piston 44e due to a pressure P2 (P1>P2), where P2 is a pressure on the downstream side of the throttle 44j. Accordingly, the spool valve 44b moves to a position where the thrust forces due to the pressures P1 an P2 and a force of the spring 44f are balanced.

If the difference between the pressures P1 and P2 is small, the spool valve 44b moves to a right side position in FIG. 14. In this state, a large opening is formed between the annular groove 44i and the fluid inflow passage 44h, and thereby a large amount of fluid is supplied to the fluid inflow passage 44n. When a large amount of fluid flows through the fluid inflow passage 44n, the pressure P1 on the upstream side of the throttle 44j is increased. Thus, the difference between the pressures P1 and P2 is increased.

When the difference between the pressures P1 and P2 is large, the spool valve 44b is positioned on the left side in FIG. 14. In this state, a small opening is formed between the annular groove 44c and the fluid inflow passage 44h. Thus, a small amount of fluid flows through the fluid inflow passage 44i, and the pressure P1 on the upstream side of the throttle 44j is decreased. Thus, the difference between the pressures P1 and P2 is decreased.

As mentioned above, in the constant flow valve 44, the position of the spool valve 44b is controlled so that a predetermined pressure difference is always generated between the pressures P1 and P2. Thus, the constant amount of fluid flowing out from the high pressure source passage 39 can be precisely maintained even if pulsation is generated in the pressure on the upstream side of the constant flow valve 44 provided in the high pressure source passage 39.

The high pressure source passage 39 is branched to a wheel cylinder passage 46 connected to the wheel cylinder 16FL and a reservoir passage 50 connected to the reservoir tank 48. Accordingly, the fluid flowing out from the high pressure source passage 39 flows into the wheel cylinder 16FL via the wheel cylinder passage 46 or flows into the reservoir 48 via the reservoir passage 50. It should be noted that the reservoir tank 48 is adapted to maintain the pressure therein at atmospheric pressure when the high pressure fluid flows into the reservoir tank 48 from the high pressure source passage 39.

The reservoir tank 48 is connected to the inlet port 34j of the variable volume pump 34 via a check valve 51. The high pressure source passage 39 is connected to the outlet port 34k of the variable volume pimp 34 via the check valve 42. The check valve 51 permits only a flow from the reservoir tank 48 to the variable volume pump 34. Accordingly, the fluid flows into the reservoir tank 48 via the reservoir tank passage 50 is then suctioned into the variable volume pump 34, and discharged from the variable volume pump 34 to the high pressure source passage 39.

A second opening/closing valve 52 and a variable throttle 54 are provided in the middle of the reservoir passage 50. The second opening/closing valve 52 comprises a valve member 52b having one end on which a pressing force of a spring 52a and the master cylinder pressure are exerted and the other end on which the discharge pressure of the variable volume pump 34 is exerted. If the valve member 52b is moved in a direction where the valve member 52 is pressed by the spring 52a (rightward in FIG. 12), the reservoir passage 50 is closed. On the other hand, if the valve member 52b is moved in a direction where the valve member 52 is pressed by the discharge pressure of the variable volume pump 34 (leftward in FIG. 12), the reservoir passage 50 is open.

In the present embodiment, the spring 52a is designed so as to satisfy the conditions where the second opening/closing valve 52 is open when the variable volume pump 34 is generating an appropriate discharge pressure, and the second opening/closing valve 52 is closed when the variable volume pump 34 is not generating an appropriate discharge pressure. Accordingly, the reservoir passage 50 is open when the variable volume pump 34 is generating a normal discharge pressure, and closed when the variable volume pump 34 is not generating a normal discharge pressure.

Figure 15:
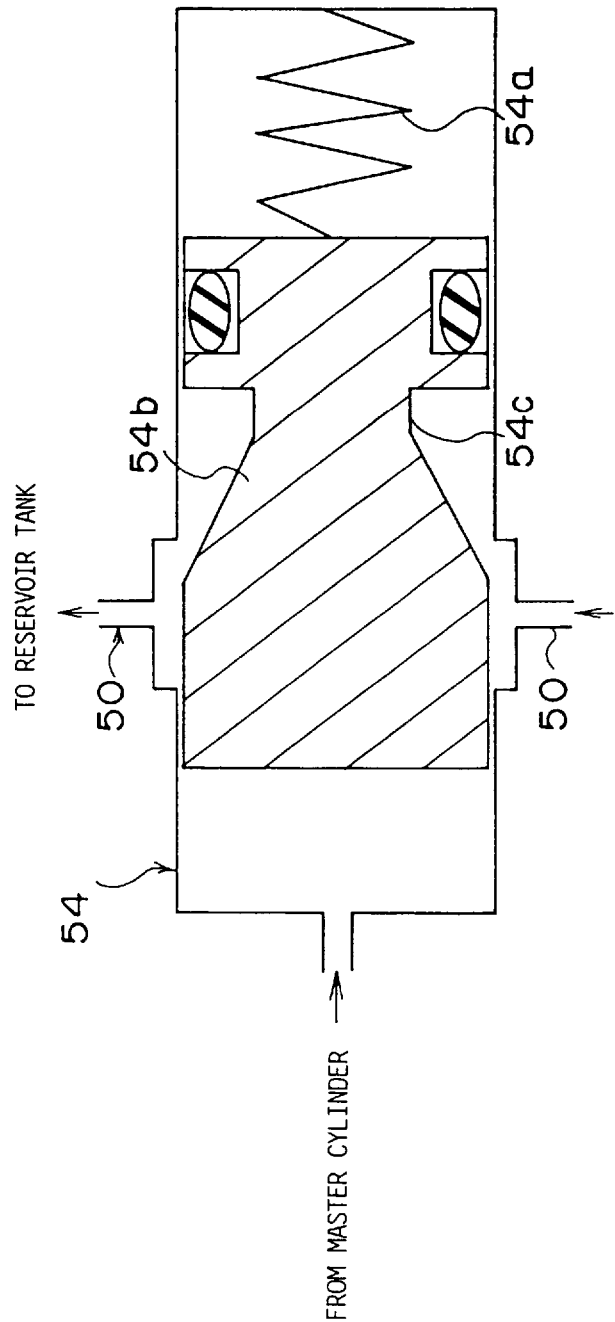
FIG. 15 is an illustration of a variable throttle shown in FIG. 12.

The variable throttle 54 comprises, as shown in FIG. 15, a spool 54b having one end to which spring 54a is contacted and the other end on which a master cylinder pressure is exerted. The spool 54b has an angular groove 54c. The annual groove 54c increasingly opens to the reservoir passage 50 which is connected to the reservoir tank 48 as the spool moves in the direction pressed by the spring 54a (leftward in FIG. 15). Therefore, the flow resistance between the annular groove 54b an the reservoir passage 50 is increased as the master cylinder pressure is increased.

When the variable volume pump 34 is generating a normal pressure, the opening/closing valve 52 is open. Thus, the fluid flowing out from the high pressure source passage is returned to the reservoir tank 48 via the reservoir passage 50. As discussed above, when the fluid flows to the reservoir passage 50, a pressure higher than the pressure in the reservoir tank 48 side of the variable throttle 54 is generated in the high pressure source passage 39 side of the variable throttle 54.

When the high pressure is generated in the high pressure source passage 39 side of the variable throttle 54, the high pressure is introduced into the wheel cylinder 16FL via the wheel cylinder passage 46. When the variable volume pump 34 is generating a normal pressure, the opening/closing valve 32 is closed. Thus, when the pressure is introduced into the wheel cylinder 16FL as mentioned above, the wheel cylinder pressure Pwc, is increased, and a brake force is generated by the wheel cylinder 16FL.

It is known that the following equation (1) is established where: Pwc is the wheel cylinder pressure which corresponds to the pressure on the high pressure source passage 39 side of the variable throttle 54; Pres is the reservoir pressure which corresponds to the reservoir tank 48 side of the variable throttle 54; Q is an amount of the fluid flowing out from the high pressure source passage 39; A is the effective opening area of the variable throttle 54; and, τ is a density of the fluid.

$$Q = C \cdot A \sqrt{2(Pwc - Pres)/\tau} \quad (1)$$

In the above-mentioned equation (1), the reservoir pressure Pres can be regarded as the atmospheric pressure (0.1 MPa). Accordingly, the wheel cylinder pressure Pwc is expressed as follows.

$$Pwc = (\tau/2) \, Q^2/(C^2 \cdot A^2) + 0.1 \quad (2)$$

The pressure value "0.1 MPa" in the equation (2) is negligibly small as compared to the pressure Pwc.

In the present embodiment, the fluid amount Q is maintained to be constant by the constant flow valve 44. Additionally, the equation (2) indicates that the wheel cylinder pressure Pwc is reversely proportional to a square of the effective opening area A of the variable throttle 54. Thus, according to the hydraulic brake system of the present embodiment, the wheel cylinder pressure Pwc can be precisely controlled by controlling the effective opening area A. That is, the wheel cylinder pressure Pwc can be increased by decreasing the effective opening area A, and the pressure Pwc can be decreased by increasing the effective opening area A.

Additionally, the hydraulic brake system of the present embodiment is adapted to generate the wheel cylinder pressure Pwc corresponding to the operational force of the brake when a braking operation is performed. Thus, an appropriate brake force corresponding to the operational force of the brake can be generated when the brake pedal 26 is depressed.

In the hydraulic brake system of the present embodiment, if the variable volume pump 34 malfunctions, the opening/closing valve 32 is turned from the open state to the closed state. Then, the opening/closing valve 52 is turned from the open state to the closed state. Thereafter, the brake fluid pressure can be supplied from the master cylinder 28 to the wheel cylinder 116FL while preventing the release of the brake fluid pressure from the wheel cylinder 16FL to the reservoir tank 48.

Especially, each component part in the resent embodiment is designed, so that when a situation occurs where the variable volume pump 34 cannot generate a normal pressure, the opening/closing valve 32 is open first, and the opening/closing valve 52 is subsequently closed. This structure prevents an occurrence of a state in which the wheel cylinder 16FL is disconnected from both the master cylinder 28 and the reservoir tank 48 while the opening/closing valves 32 and 52 are switched.

According to this structure, if a high pressure remains in the accumulator 40 when the variable volume pump 54 malfunctions, the wheel cylinder pressure will not rapidly increase due to the pressure in the accumulator 40 while the opening/closing valves 32 and 52 are switched. Additionally, if a high pressure remains in the wheel cylinder when the variable volume pump 34 malfunctions, the pressure in the wheel cylinder will not be unnecessarily maintained.

As discussed above, in the present embodiment, a brake force can be precisely controlled by controlling the effective opening area A of the variable throttle 54 in response to the master cylinder pressure. Additionally, when the variable volume pump 34 malfunctions, a brake force is positively maintained by introducing the master cylinder pressure into the wheel cylinder 16FL.

In the present embodiment, the amount Q of the fluid flowing out from the high pressure source passage 39 is stabilized by providing the constant flow valve 44 in the high pressure source passage 39. The amount Q of the fluid is one of parameters which determines the wheel cylinder pressure Pwc as indicated by the equation (2). Accordingly, it is difficult to precisely control the wheel cylinder pressure Pwc no matter how the effective opening area A of the variable throttle 54 is precisely controlled under the condition in which the amount Q fluctuates in a wide range. In this respect the hydraulic brake system of the present embodiment can provide a more precise control as compared to a system which does not have the constant flow valve 4.

Figure 16:
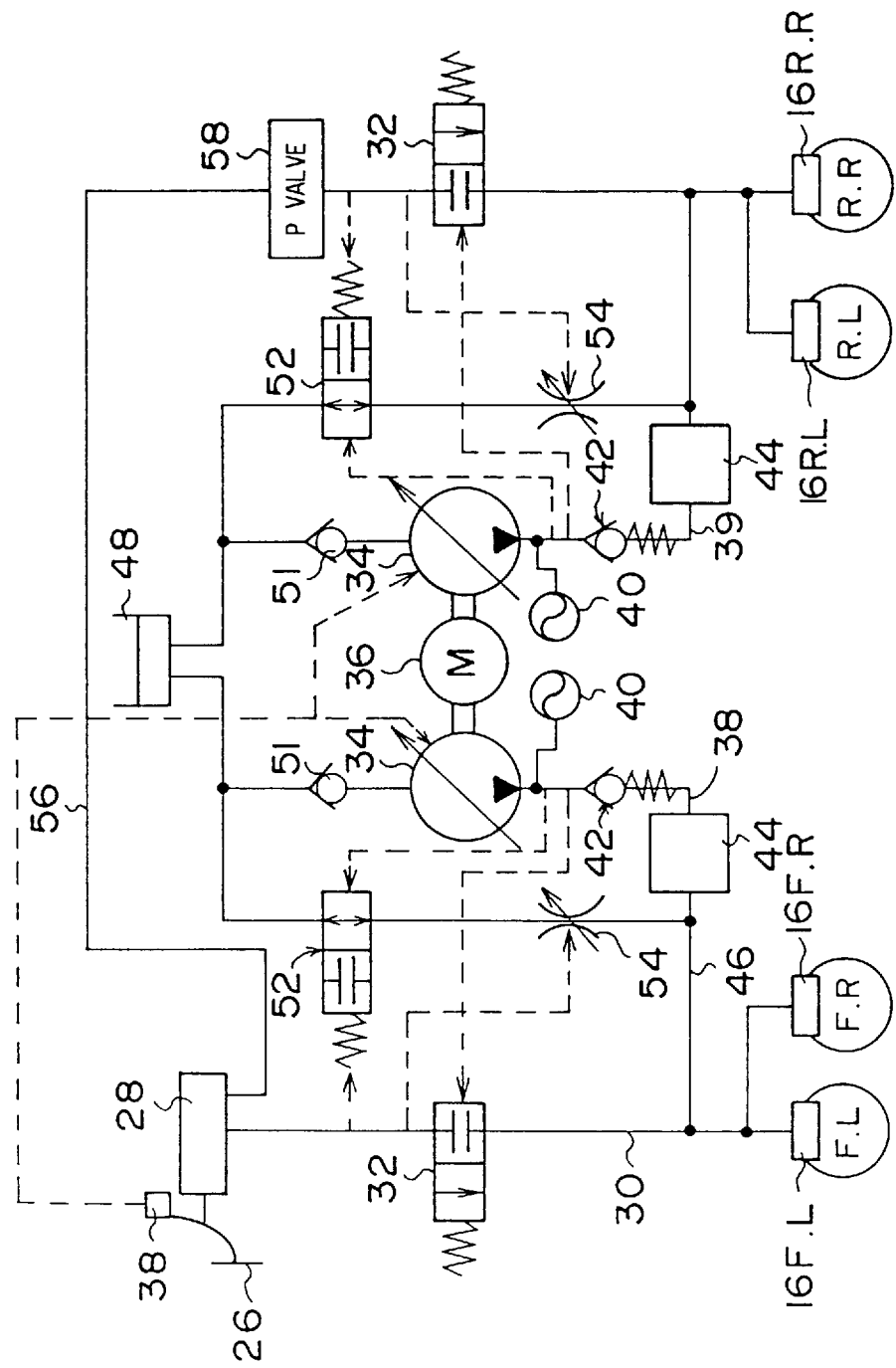
FIG. 16 is a hydraulic circuit diagram of an entire circuit including a hydraulic actuator and wheel cylinders shown in FIG. 11.

FIG. 16 is a hydraulic circuit diagram of an entire circuit including the hydraulic actuator 24 and the wheel cylinders 16FL, 16FR, 16RL and 16RR in the first embodiment of the present invention. In FIG. 16, parts that are the same as the parts shown in FIG. 12 are given the same reference numerals, and descriptions thereof will be omitted.

The vehicle 10 has the four wheel cylinders 16FL, 16FR, 16RL and 16RR provided to the respective wheels. In an automobile of a front-engine rear-drive type, generally two separate hydraulic fluid circuits are provided, one for the left and right front wheels FL and FR and the other for the left and right rear wheels RL and RR. Such a hydraulic brake system is provided by the circuit shown in FIG. 16.

Figure 1:
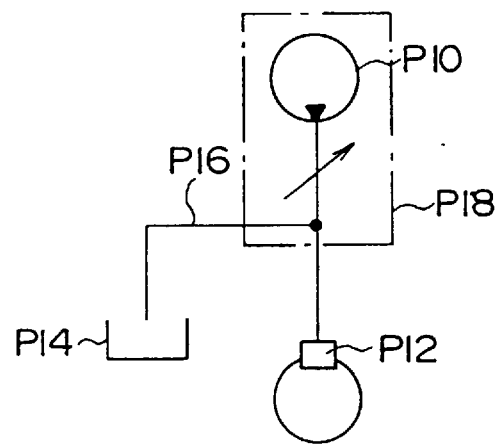
FIG. 1 is a hydraulic circuit diagram for explaining a principle of one aspect of the present invention.
Figure 2:
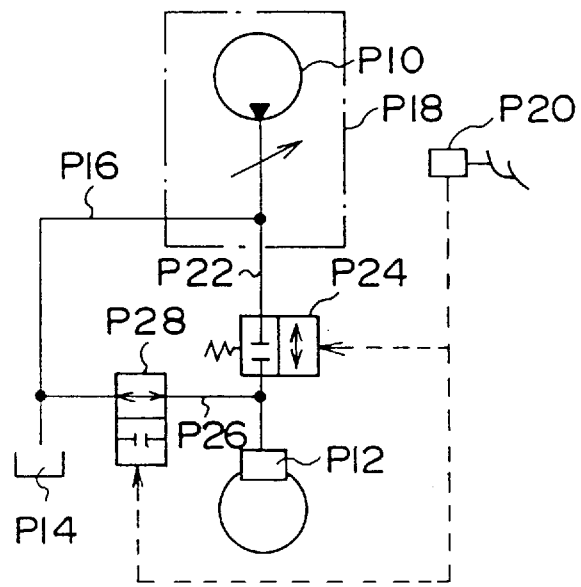
FIG. 2 is a hydraulic circuit diagram for explaining a principle of another aspect of the present invention.
Figure 3:
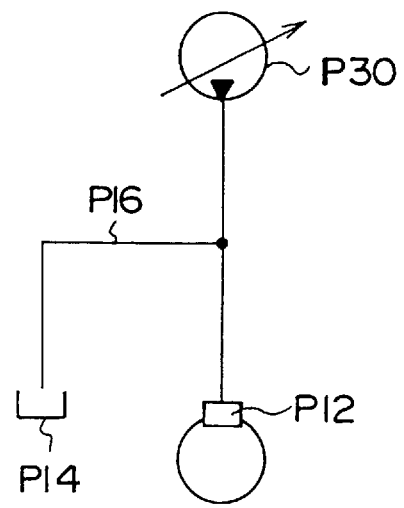
FIG. 3 is a hydraulic circuit diagram for explaining a principle of another aspect of the present invention.
Figure 4:
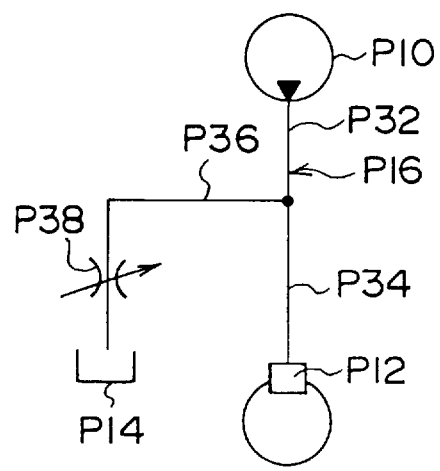
FIG. 4 is a hydraulic circuit diagram for explaining a principle of another aspect of the present invention.
Figure 5:
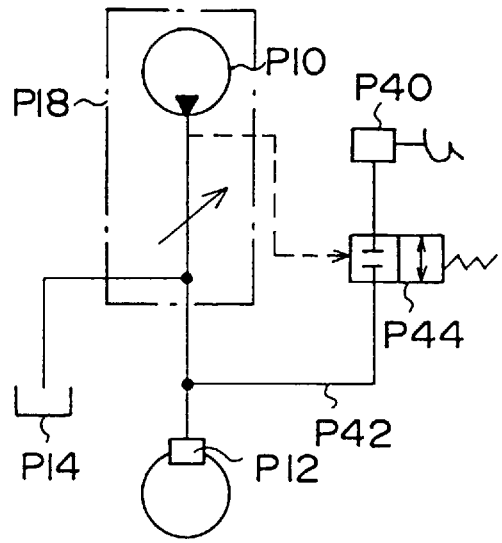
FIG. 5 is a hydraulic circuit diagram for explaining a principle of another aspect of the present invention.
Figure 6:
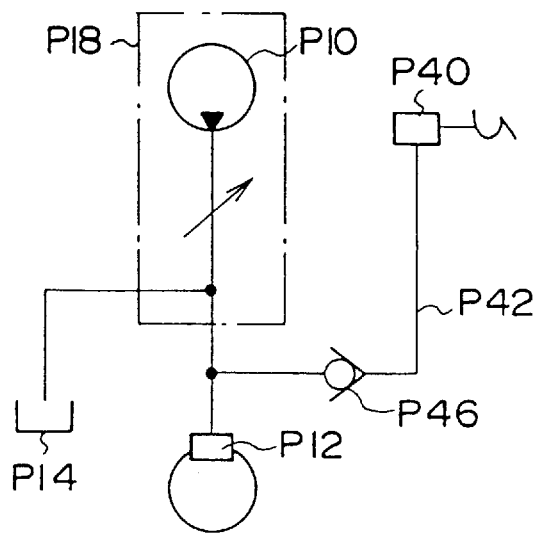
FIG. 6 is a hydraulic circuit diagram for explaining a principle of another aspect of the present invention.
Figure 7:
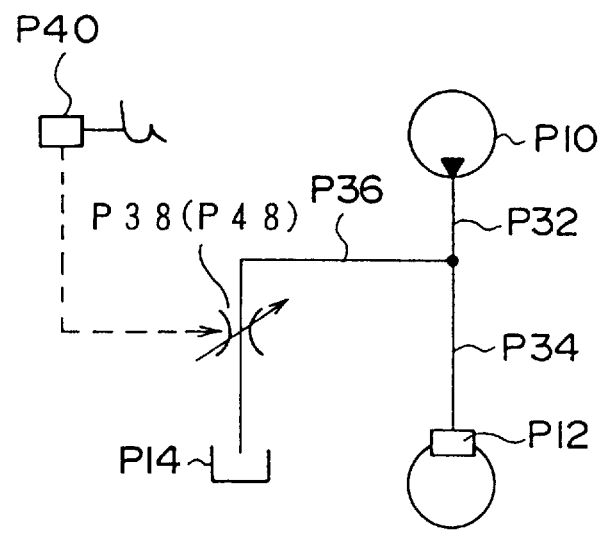
FIG. 7 is a hydraulic circuit diagram for explaining a principle of another aspect of the present invention.
Figure 8:
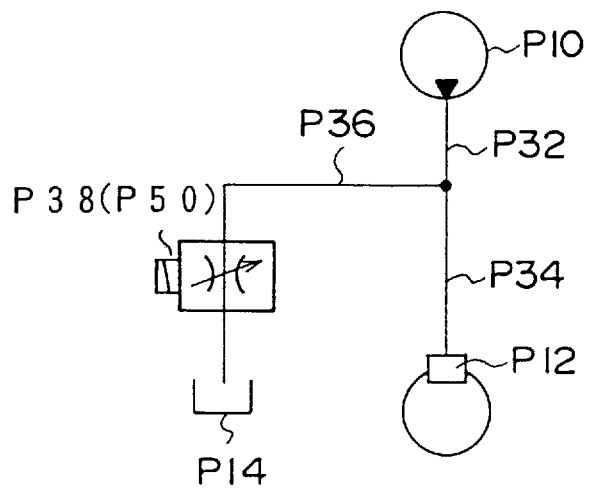
FIG. 8 is a hydraulic circuit diagram for explaining a principle of another aspect of the present invention.

In FIG. 16, the master cylinder 28 is a tandem brake master cylinder having two hydraulic pressure generating chambers therein. The master cylinder passages 30 and 56 are connected to the respective chambers of the master cylinder 28. The hydraulic circuit for the wheel cylinders 16FL and 16FR is realized by connecting the wheel cylinders 16FL and 16FR in parallel to the master cylinder passage 30 to which, in FIG. 2, only the wheel cylinder 16FL is connected. In this structure, a brake force corresponding to the operational force applied to the brake pedal 26 can be generated in both the wheel cylinders 16FL and 16FR.

The hydraulic circuit for the wheel cylinders 16RL and 16RR is provided by connecting the wheel cylinders 16FL and 16FR in parallel to the master cylinder passage 56 and providing a proportioning valve (P valve) 58 in the master cylinder passage 56. The F valve 58 is a valve to decrease the master cylinder pressure with a predetermined ratio.

Weight of the vehicle 10 is shifted toward the front wheels since the engine is situated in the front part of the vehicle. Additionally, the weight of the vehicle 10 is sifted to the front end during a braking operation. Thus, if the same master cylinder pressure Pwc is supplied to the rear wheel cylinders 16FL and 16RR and the front wheel cylinders 16FL and 16FR, the rear wheels RL and RR corresponding to the rear wheel cylinders 16RL and 16RR tend to be locked.

In order to eliminate such a problem, the P valve 58 is provided in the master cylinder passage 56 so as to supply a pilot pressure to the variable throttle 54 on the downstream side of the P valve 58. According to this structure, the master cylinder pressure is directly supplied as a pilot pressure to the variable throttle 54 provided in the hydraulic circuit for the front wheels FL and FR, whereas the pilot pressure which is decreased with a predetermined ratio is supplied to the variable throttle 54 provided in the hydraulic circuit for the rear wheels RL and RR. As a result, a brake force generated in the rear wheels RL and RR is smaller than a brake force generated in the front wheels FL and FR. Accordingly, in the hydraulic brake system of the present embodiment, brake forces generated in the front wheels a in the rear wheels can be determined by considering the load ratio of the rear wheels to the front wheels.

Figure 17:
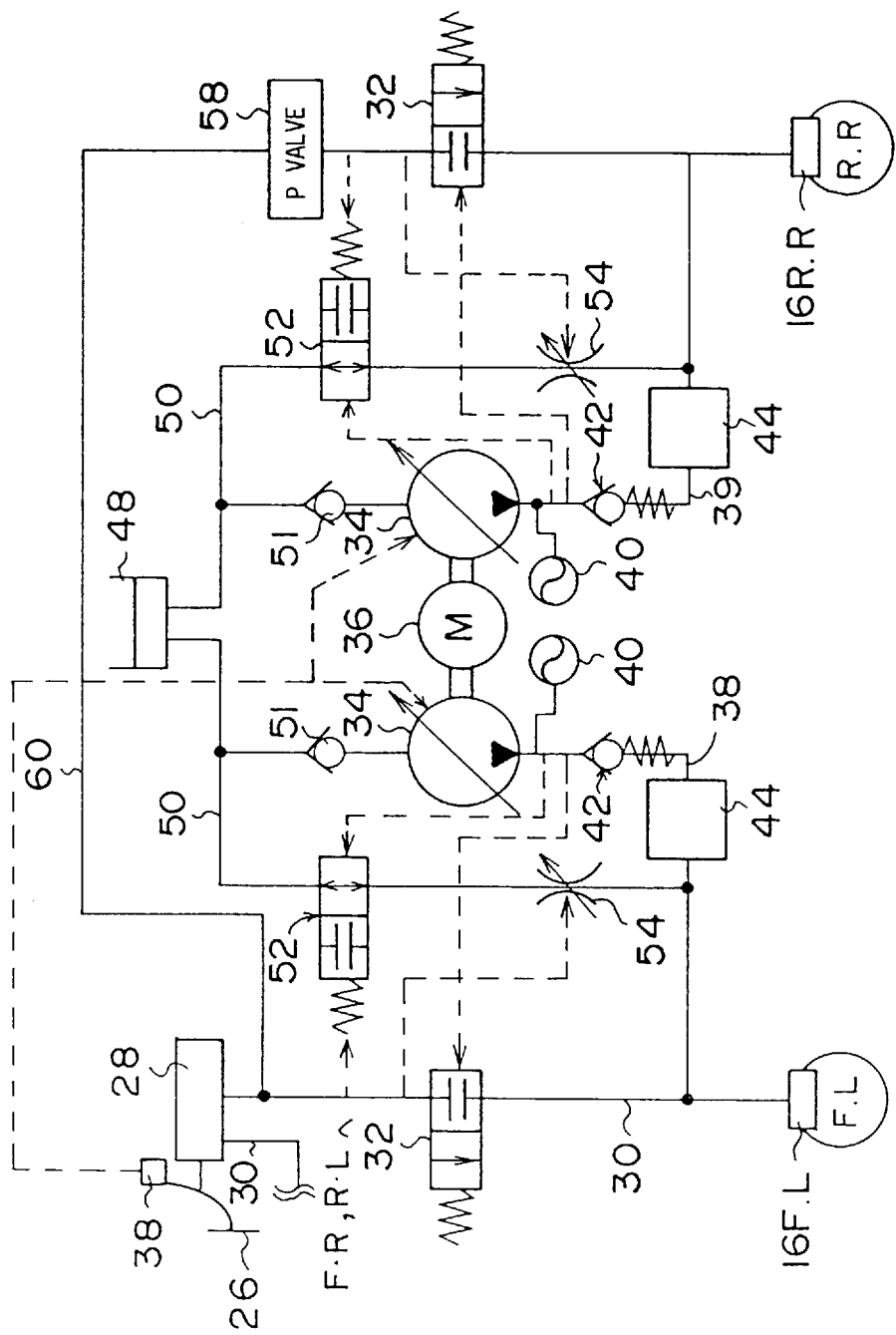
FIG. 17 is a hydraulic circuit diagram of a part of a hydraulic brake system according to a second embodiment of the present invention.

A description will now be given, with reference to FIG. 17, of a second embodiment of the present invention. FIG. 17 is a hydraulic circuit diagram of a part of a hydraulic brake system according to the second embodiment of the present invention. In FIG. 17, parts that are the same as the parts shown in FIG. 16 are given the same reference numerals, and description thereof will be omitted.

In an automobile of a front-engine front drive type, generally two separate hydraulic fluid circuits are provided, one for the left front and right rear wheels FL and RR and the other for the right front and left rear wheels FR and RL. Such a hydraulic brake system is provided by the circuit shown in FIG. 17.

In FIG. 17, the master cylinder 28 is a tandem brake master cylinder having two hydraulic pressure generating chambers therein. The master cylinder passages 30 are connected to the respective chambers of the master cylinder 28, one for the hydraulic circuit for the left front and right rear wheels FL and RR and the other (not shown in the figure) for the hydraulic circuit for the right front and left rear wheels FR and RL. Since the two hydraulic circuits are identical to each other, a description will be given only for the hydraulic circuit for the left front and right rear wheels FL and RR shown in FIG. 17.

The wheel cylinder 16FL corresponding to the left front wheel FL is connected to the master cylinder passage 30 via the opening/closing valve 32. Another master cylinder passage 60 is also connected to the master cylinder passage 30 to connect the right rear wheel cylinder 16RR to the master cylinder 28. The P valve 56 is provided in the middle of the master cylinder passage 60. A pilot pressure is supplied from the downstream side of the P valve 56 to the variable throttle 5 for the right rear wheel cylinder 16RR of the right ear wheel RR.

According to the above-mentioned structure, the master cylinder pressure is directly supplied as a pilot pressure to the variable throttle 54 provided for the left front wheel, whereas the pilot pressure which is decreased with a predetermined ratio is supplied to the variable throttle 54 provided for the right rear wheel RR. As a result, a brake force generated in the right rear wheel RR is smaller than a brake force generated in the left front wheel FL. Accordingly, in the hydraulic brake system of the present embodiment, brake forces generated in the front wheels and the rear wheels can be determined by considering the load ratio of the rear wheels to the front wheels while using the hydraulic circuit for the left front and right rear wheels FL and RR and the hydraulic circuit for the right front and left rear wheels FR and RL.

Figure 18:
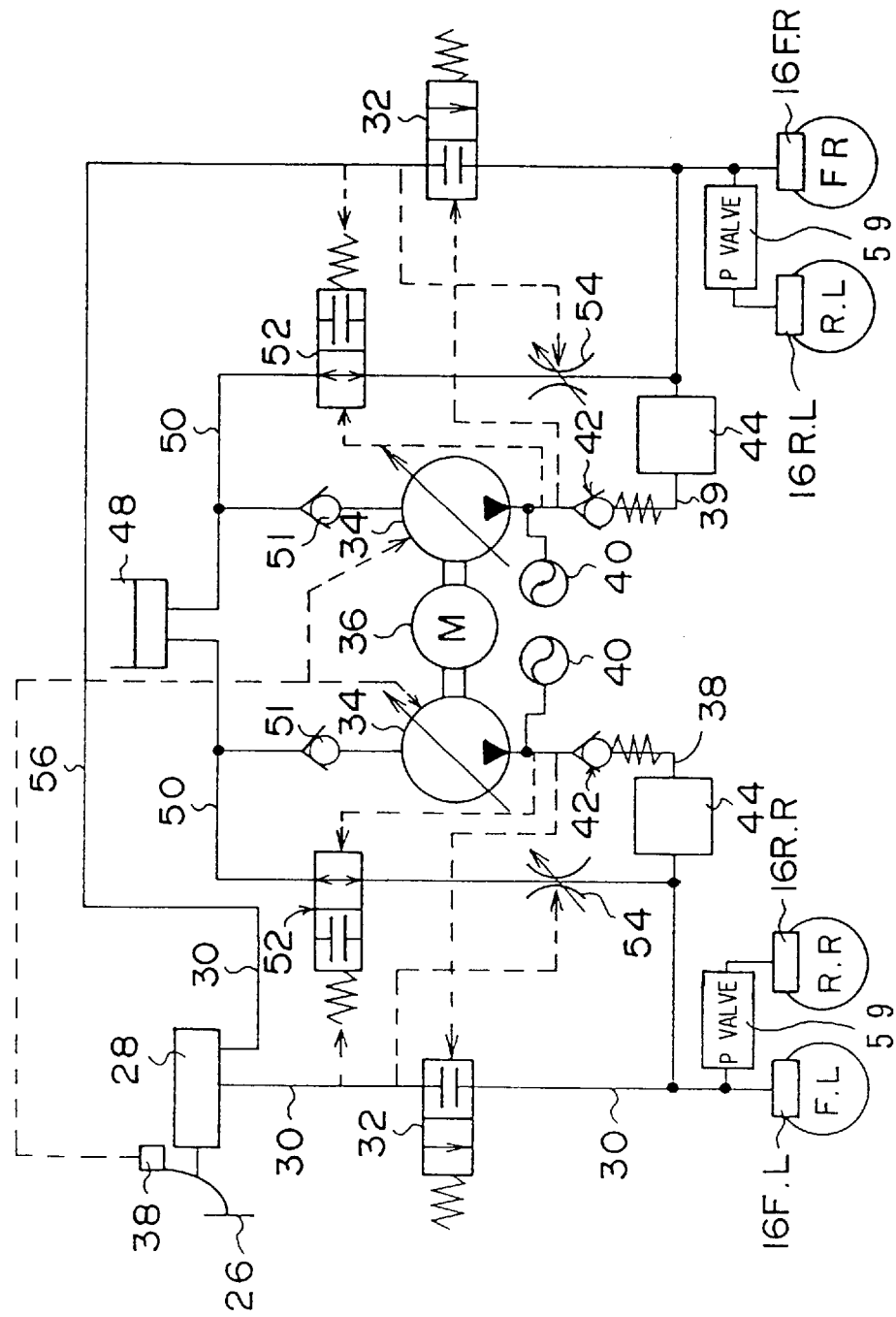
FIG. 18 is a hydraulic circuit diagram of a hydraulic brake system according to a third embodiment of the present invention.

A description will now be given, with reference to FIG. 18, of a third embodiment of the present invention. FIG. 18 is a hydraulic circuit diagram of a part of a hydraulic brake system according to the third embodiment of the present invention. The hydraulic brake system according to the third embodiment has two separate hydraulic circuit systems similarly to the second embodiment, that is, one for the left front and right rear wheels FL and RR and the other for the right front and left rear wheels FR and RL. In FIG. 18, parts that are the same as the parts shown in FIG. 16 are given the same reference numerals, and descriptions thereof will be omitted.

In FIG. 18, the master cylinder 28 is a tandem brake master cylinder having two hydraulic pressure generating chambers therein. The master cylinder passages 30 and 56 are connected to the respective chambers of the master cylinder 28. The master cylinder passage 30 connects the left front and right rear wheels FL and RR to the master cylinder 28. The master cylinder passage 56 connects the right front and left rear wheels FR and RL. The wheel cylinder 16RR corresponding to the right rear wheel RR is connected to the master cylinder passage 30 via a proportional valve (P valve) 59. The wheel cylinder 16RL corresponding to the left rear wheel RL is connected to the master cylinder passage 58 via another P valve 59.

According to the above-mentioned structure, the master cylinder pressure is directly supplied to the left and right wheel cylinders 16FL and 16FR corresponding to the left and right front wheels FL and FR via the respective master cylinder passages 30 and 60, whereas a pressure reduced by the respective P valve is supplied to the left and right wheel cylinders 16LR and 16RR corresponding to the left and right wheels LE and RR. Accordingly, in the hydraulic brake system of the present embodiment, brake forces generated in the front wheels and the rear wheels can be determined by considering the load ratio of the rear wheels to the front wheels.

Figure 19:
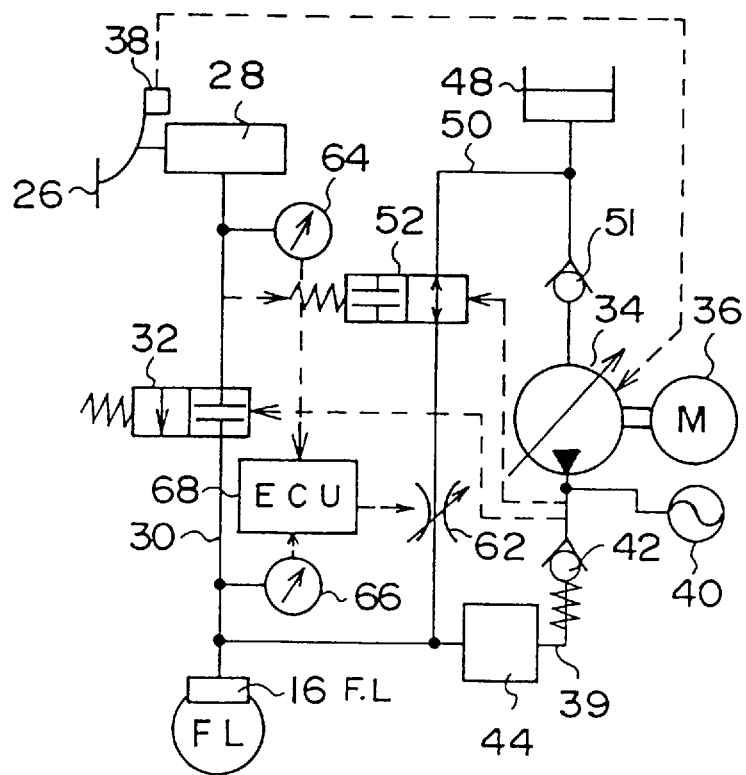
FIG. 19 is a hydraulic circuit diagram of a part of a hydraulic brake system according to a fourth embodiment of the present invention.

A description will now be given, with reference to FIGS. 19, 20 and 21, of a fourth embodiment of the present invention. FIG. 19 is a hydraulic circuit diagram of a part of a hydraulic brake system according to the fourth embodiment of the present invention. In FIG. 19, parts that are the same as the parts shown in FIG. 12 are given the same reference numerals, and descriptions thereof will be omitted.

A structure of the hydraulic brake system according to the fourth embodiment is the sale as that of the hydraulic system according to the first embodiment except for the variable throttle 54 being replaced by an electrically controlled variable throttle 62

Figure 20:
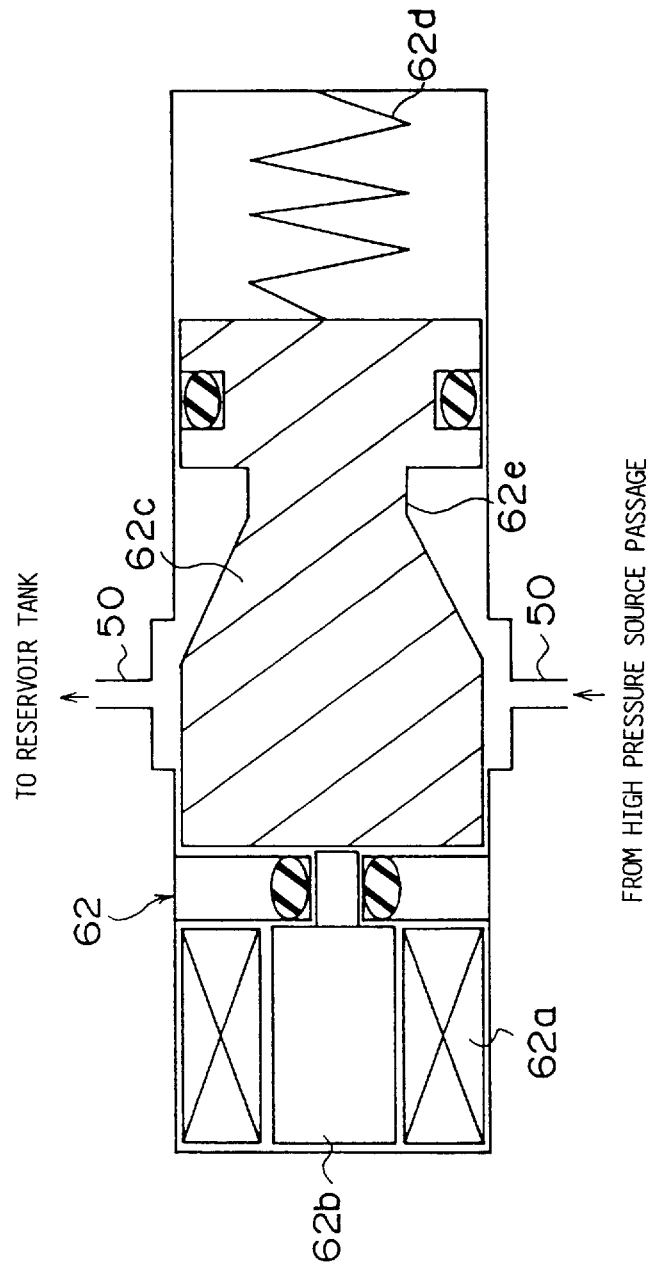
FIG. 20 is an illustration of a variable throttle shown in FIG. 19.

The variable throttle 62 comprises, as shown in FIG. 20, an electromagnetic coil 62a and a spool 62b which together constitute a linear solenoid actuator. When an electric current flows in the coil 62a, the plunger 62b is moved in a direction to the right in FIG. 20. An end (a right end in FIG. 20) of the plunger 62b contacts a spool 62c. The spool 62c is slidable within the variable throttle 62. A spring 62d contacts an opposite end of the spool 62c so that the spool 62c is pressed by the spring 62d. The spool 62c has an annular groove 62e. The annual groove 62e increasingly opens to the reservoir passage 50 which is connected to the reservoir tank 48 as the spool 62c moves in the direction pressed by the spring 62d (leftward in FIG. 20).

In the above-mentioned structure, the flow resistance between the annular groove 62e an the reservoir passage 50 is decreased as the spool 62c is moved to the left by the spring 62d. Accordingly, the flow resistance of the reservoir passage 50 is minimized when no current flows in the electromagnetic coil 62a. The flow resistance is increased as a current flowing in the electromagnetic coil 62a is increased. Thus, in the present invention, a brake force generated by the wheel cylinder 16FL can be controlled by controlling the current flowing in the electromagnetic coil 62a.

In the present embodiment, pressure sensors 64 and 66 are provided on the upstream and downstream side of the opening/closing valve 32 in the master cylinder passage 301 respectively. The pressure sensor 64 senses the master cylinder pressure, and the pressure sensors 66 senses the wheel cylinder pressure.

Output signals from the pressure sensor are supplied to an electronic control unit (ECU) 68. The ECU 68 controls the variable throttle 62 based on the output signals of the pressure sensors 64 and 66. The ECU 68 stores data of an amplifying ratio for the brake pressure. The ECU 68 controls a current flowing in the electromagnetic coil 62a of the variable throttle 62 so that the wheel cylinder pressure becomes equal to a multiple of the master cylinder pressure and the amplifying ratio.

When the ECU 68 performs such a control, a wheel cylinder pressure corresponding to the master cylinder pressure, that is, a wheel pressure corresponding to an operational force applied to the brake pedal 26 is generated in the wheel cylinder 16FL. Accordingly, in the hydraulic brake system of the present embodiment, an appropriate brake force corresponding to the operational force applied to the brake pedal 26 can be generated by the wheel cylinder 16FL.

In the field of automobile technology, an antilock brake system (ABS) and a traction control system (TRC) are known. The ABS is for preventing locking of a wheel due to an excessive brake force. The TRC is for preventing spinning of a wheel due to an excessive driving force.

A function of the ABS is achieved by controlling the wheel cylinder pressure. That is, the wheel cylinder pressure is forcibly decreased or maintained when it is determined that one of the wheels tends to fall into a locked condition during a braking operation, and an increase of the wheel cylinder pressure is permitted after the possibility of locking is eliminated.

A function of the TRC is also achieved by controlling the wheel cylinder pressure. That is, the wheel cylinder pressure is forcibly increased when it is determined that one of the wheels tends to fall into a spin condition during an acceleration, and is decreased when the possibility of spinning is eliminated.

Accordingly, in the hydraulic brake system shown in FIG. 19, if the ECU 68 controls the variable throttle 62 based on the above-mentioned scheme, the functions of the ABS and TRC are provided in the hydraulic brake system according to the present embodiment.

Figure 21:
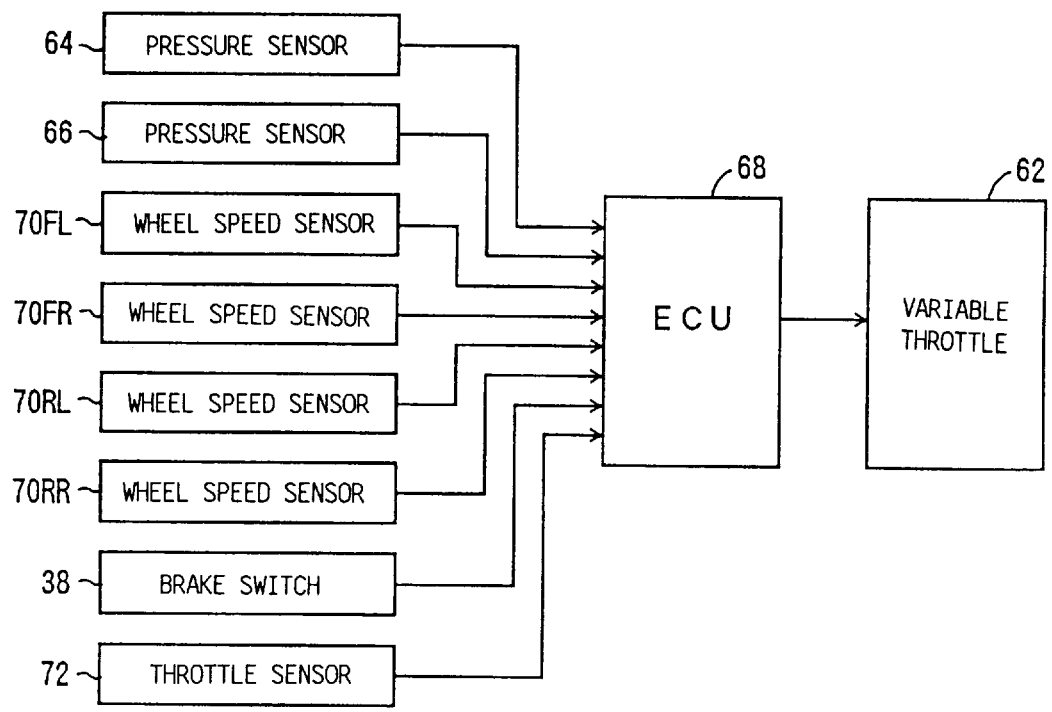
FIG. 21 a block diagram of a control mechanism which provides ABS and TRC functions in the hydraulic brake system according to the fourth embodiment.

FIG. 21 a block diagram of a control mechanism which provides the above-mentioned functions in the hydraulic brake system according to the present embodiment. In FIG. 21, parts the same as the parts shown in FIG. 19 are give the same reference numerals, and descriptions thereof will be omitted.

In FIG. 21, wheel sensors 70FL, 70FR, 70RL and 70RR generate pulse signals according to rotational speeds of the respective wheels FL, FR, RL and RR. The ECU 68 determines the rotational speed of each of the wheels by detecting the cycle period of the pulse signals. A throttle sensor 72 senses a degree of opening of a throttle valve in the automobile having the hydraulic brake system according to the present embodiment. The ECU 68 can determine whether or not the vehicle is in an acceleration state by detecting the degree of opening of the throttle sensor 72.

The ECU 68 determines, when a brake switch is on, that a braking operation is being performed so as to execute a control (hereinafter referred to as an ABS control) for performing an ABS function. Additionally, the ECU 68 determines, when a predetermined acceleration state is detected by the throttle sensor 72, that an acceleration is performed so as to execute control (hereinafter referred to as a TRC control) for performing a TRC function.

In the ABS control, the ECU 68 calculates an assumed vehicle speed based on the output signals of the wheel speed sensors 70FL, 70FR, 70RL and 70RR. In the present embodiment, the fastest wheel speed among the wheel speeds detected by the wheel speed sensors 70FL, 70FR, 70RL and 70RR is used as the vehicle speed. Thereafter, the ECU 68 compares the calculated assumed vehicle speed with the wheel speed of each of the wheels FL, FR, RL and RR. If one of the wheel speed is extremely slower than the assumed vehicle speed, it is determined that the wheel corresponding to the particular wheel speed is possibly in a locked state.

If it is determined from the results of the comparison that there is no possibility that the wheel FL is in a locked state, the ECU 68 controls the variable throttle 62 so that the wheel cylinder pressure corresponding to the master cylinder pressure is generated in the wheel cylinder 16FL. Hereinafter this control mode is referred to as a pressure increase mode. Additionally if it is determined that there if a possibility that the wheel FL is in a locked state, the ECU 68 controls the variable throttle 62 so as to decrease or maintain the wheel cylinder pressure in the wheel cylinder 16FL.

The decrease in the wheel cylinder pressure can be achieved by increasing the effective opening area of the variable throttle 62. Hereinafter this control mode is referred to as a pressure decrease mode. Additionally, the pressure can be maintained at substantially the same level by alternately repeating the pressure increase mode and the pressure decrease mode. Hereinafter this control mode is referred to as a pressure maintain made. It should be noted that the wheel cylinder pressure can be maintained by maintaining the effective opening area of the variable throttle 62.

As discussed above, in the hydraulic brake system according to the present embodiment, the wheel FL is positively prevented from falling into a locked state during a braking operation due to an excessive brake force. Although the above-mentioned control is related only to the left front wheel FL, the same control is applied to other wheel FR, RL and RR so as to provide the ABS function.

In the TRC control, the ECU 68 calculate assumed vehicle speed based on the output signals from each of the wheel speed sensors 70FL, 70FR, 70RL and 70RR. In the present embodiment, an average of the wheel speeds detected by the wheel speed sensors 70RL and 70RR of the idler wheels (in this case, the rear wheels RL and RR) is used as the vehicle speed. Thereafter, the ECU 68 compares the calculated assumed vehicle speed with each of the wheel speeds of the driving wheels FL and FR. If the wheel speeds of the driving wheels FL and FR are extremely faster than the assumed vehicle speed, it is determined that a spin condition has occurred in the driving wheels.

In the above-mentioned comparison, if it is determined that no spin condition exists in the wheel FL, no special control is performed. Thus, the ECU 68 controls the variable throttle 62 so that the wheel cylinder pressure corresponding to the master cylinder pressure is generated. On the other hand, if it is determined that a spin is occurring in the driving wheel FL, the ECU 68 controls the variable throttle 62 so as to forcibly increase the wheel cylinder pressure of the wheel cylinder 16FL. When the wheel cylinder pressure is forcibly increased, a brake force is generated in the wheel cylinder 16FL and the spin of the drive wheel is suppressed. It should be noted that the forcible increase in the wheel cylinder pressure can be realized by decreasing the effective opening area of the variable throttle 62.

As discussed above, in the hydraulic brake system according to the present embodiment, the wheel FL is positively prevented from falling into a spin condition during an acceleration due to excessive driving force. Although the above-mentioned control is related only to the left front wheel FL, the same control is applied to other wheel FR, RL and RR so as to realize the TRC function.

Figure 9:
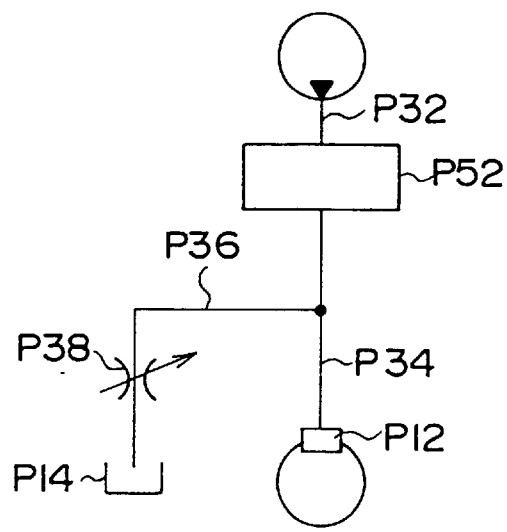
FIG. 9 is a hydraulic circuit diagram for explaining a principle of another aspect of the present invention.
Figure 10:
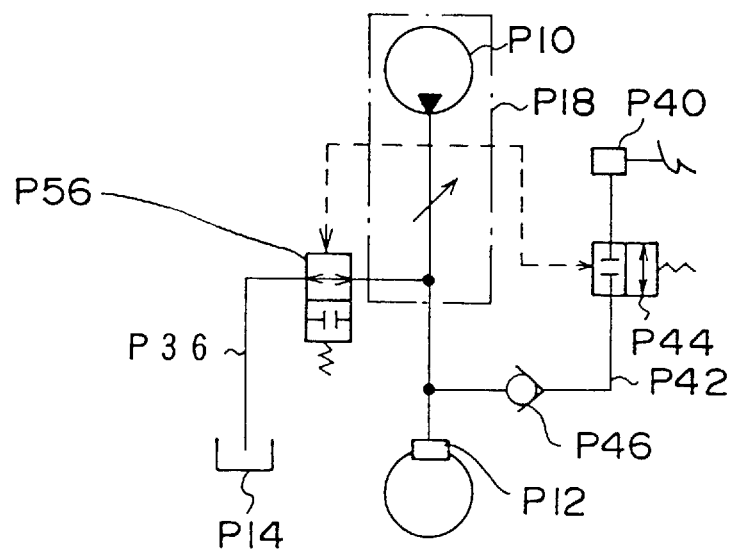
FIG. 10 is a hydraulic circuit diagram for explaining a principle of another aspect of the present invention.
Figure 22:
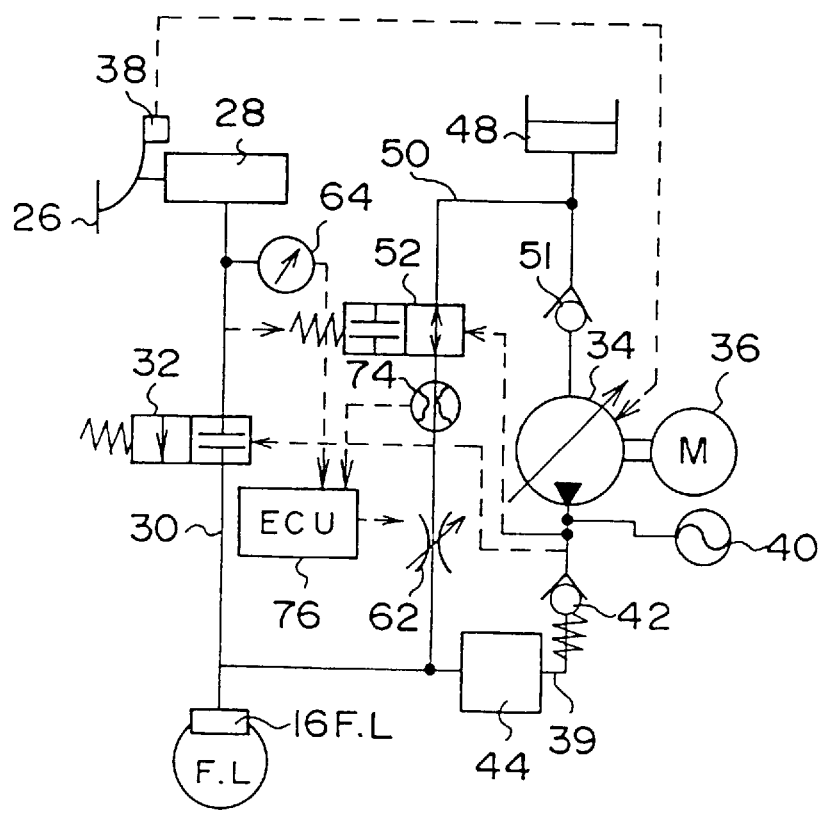
FIG. 22 is a hydraulic circuit diagram of a part of a hydraulic brake system according to a fifth embodiment of the present invention.

A description will now be given, with reference to FIGS. 22, of a fifth embodiment of the present invention. FIG. 22 is a hydraulic circuit diagram of a part of a hydraulic brake system according to the fifth embodiment of the present invention. In FIG. 22, parts that are the same as the parts shown in FIG. 9 are given the same reference numerals, and descriptions thereof will be omitted.

The hydraulic brake system according to the present embodiment uses a flow sensor 74 provided in the reservoir passage 52 between the variable throttle 62 and the reservoir tank 48 instead of the pressure sensor 66 of the fifth embodiment.

If the amount Q of fluid flowing out from the high pressure source passage 39 is constant, the wheel cylinder pressure Pwc is determined by the effective opening area A of the variable throttle 62. On the other hand, if the amount Q is constant, the amount q of the fluid flowing from the variable throttle 62 to the reservoir tank 48 is determined by the effective opening area A of the variable throttle 62 and the difference Pwc-Pres (nearly equal to Pwc) between pressures across the variable throttle 62. Accordingly, if the an amount q of the fluid flowing from the variable throttle 62 to the reservoir tank 48 is known, a level of the pressure difference Pwc-Pres can be assumed, that is, a level of the wheel cylinder pressure Pwc can be assumed.

In the present embodiment, an ECU 76 stores therein two-dimensional map data of the wheel cylinder pressure Pwc in which the amount q of the fluid flowing from the variable throttle 62 to the reservoir tank 48 is used as a parameter. Additionally, the ECU 76 has a function to assume the effective opening area A of the variable throttle 62 based on the current supplied to the electromagnetic coil of the variable throttle 62.

The ECU 76 calculates, when controlling the variable throttle 62, the amount q of the fluid based on an output of the flow sensor 74 and assumes the effective opening area A based on the current value supplied to the electromagnetic coil 62a. Thereafter, the two-dimensional map is searched based on q and A to determine the wheel cylinder pressure Pwc. If the pressure Pwc is less than a value obtained by a multiple of the master cylinder pressure and a predetermined amplification ratio, the current supplied to the electromagnetic coil 62a is increased. If the pressure Pwc is greater than a value obtained by a multiple of the master cylinder pressure and a predetermined amplification ratio, the current supplied to the electromagnetic coil 62a is decreased When the ECU 76 performs such a control the wheel cylinder pressure Pwc in the wheel cylinder 16FL is precisely controlled to the pressure obtained by the multiple of the master cylinder pressure and the predetermined amplification ratio. Accordingly, in the hydraulic brake system according to the present embodiment, an appropriate brake force corresponding to an operational force to the brake pedal 26 can be generated by the wheel cylinder 16FL.

It should be noted that if the control mechanism described with reference to FIG. 21 is adopted in the present embodiment by using the ECU 76, The ABS and TRC functions can also be achieved in the present embodiment.

Figure 23:
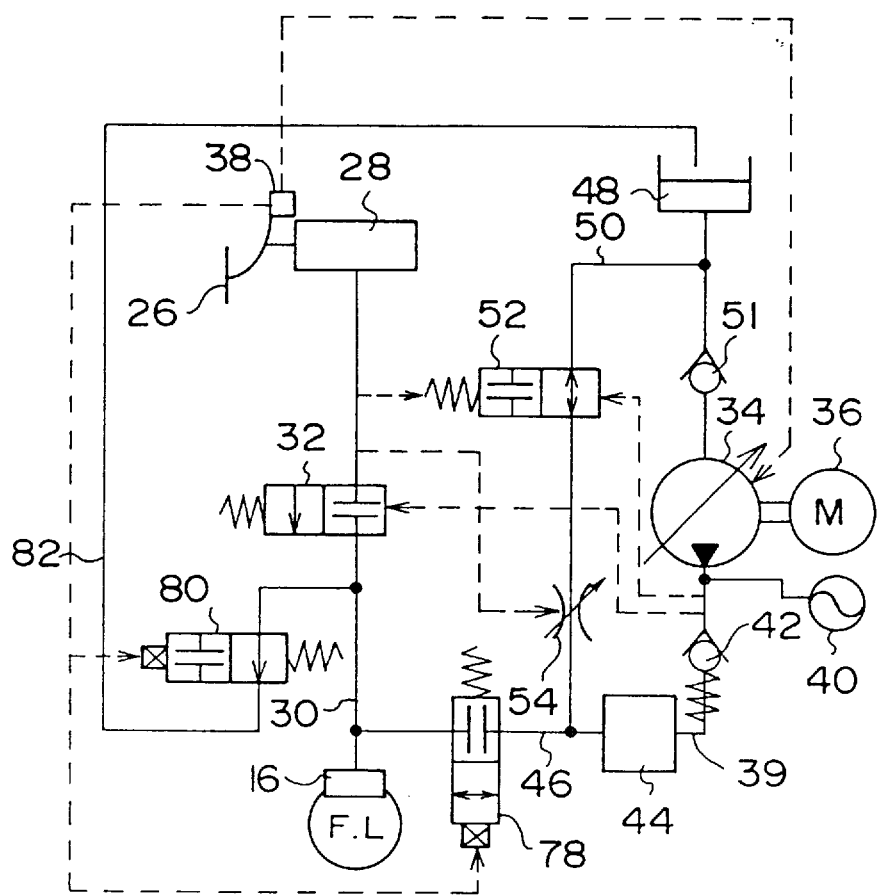
FIG. 23 is a hydraulic circuit diagram of a part of a hydraulic brake system according to a sixth embodiment of the present invention.

A description will now be given, with reference to FIGS. 23, of a sixth embodiment of the present invention. FIG. 23 is a hydraulic circuit diagram of a part of a hydraulic brake system according to the sixth embodiment of the present invention. In FIG. 23, parts that are the same as the parts shown in FIG. 12 are given the same reference numerals, and descriptions thereof will be omitted.

The hydraulic brake system according to the present embodiment has an opening/closing valve 78 in the middle of the wheel cylinder passage 46 between the high pressure source passage 39 and the wheel cylinder 16FL. Additionally, in the present embodiment, the wheel cylinder 16FL is connected to the reservoir tank 48 via a fluid pressure releasing passage 82 having an opening/closing valve 80.

The opening/closing valve 78 is a normally closed type solenoid valve which opens when a drive signal is supplied thereto. The opening/closing valve 78 is connected to a brake switch 38 which supplies the drive signal to the opening/closing valve 78 when the brake pedal 26 is depressed. Thus, the wheel cylinder passage 46 is closed when the brake pedal 26 is not pressed, and is open when the brake pedal 26 is pressed.

The opening/closing valve 80 is a normally open type solenoid valve which closes when a drive signal is supplied thereto. The opening/closing valve 80 is connected with the brake switch 38 which supplies the drive signal to the opening/closing valve 80 when the brake pedal 26 is pressed down. Thus, the of fluid pressure releasing passage 82 is open when the brake pedal 26 is not pressed, and is closed when the brake pedal 26 is pressed.

In the above-mentioned structure of the present embodiment, the wheel cylinder passage 46 is open and the fluid pressure releasing passage 82 is closed when the brake pedal 26 is pressed. Thus, the present embodiment has a structure substantially the same as the structure of the hydraulic brake system shown in FIG. 12. Accordingly, similar to the hydraulic brake system shown in FIG. 12, the present embodiment can generate an appropriate brake force corresponding to the master cylinder pressure by the wheel cylinder 16FL.

On the other hand, when the brake pedal 26 is not pressed in the hydraulic brake system according to the present embodiment, the wheel cylinder passage 46 is closed and the fluid pressure releasing passage 82 is open. Thus, all of the fluid flowing out of the high pressure source passage 39 is returned to the reservoir tank 48 via the reservoir passage 50 when the brake pedal 26 is not pressed. Additionally, the brake fluid pressure which remains in the wheel cylinder 16FL when the brake pedal 26 is not pressed is released to the reservoir tank 48 via the fluid pressure releasing passage 82. Accordingly, in the hydraulic brake system according to the present embodiment, an occurrence of a phenomenon in which a brake force is generated when a braking operation is not performed, that is, so-called brake drug can be positively prevented.

Although the opening/closing valves 78 and 80 are comprised of solenoid valves in the present embodiment, the present invention is not limited to this and the opening/ closing valves 78 and 80 may be valve mechanisms which are operated by the master cylinder pressure as a pilot pressure.

Figure 24:
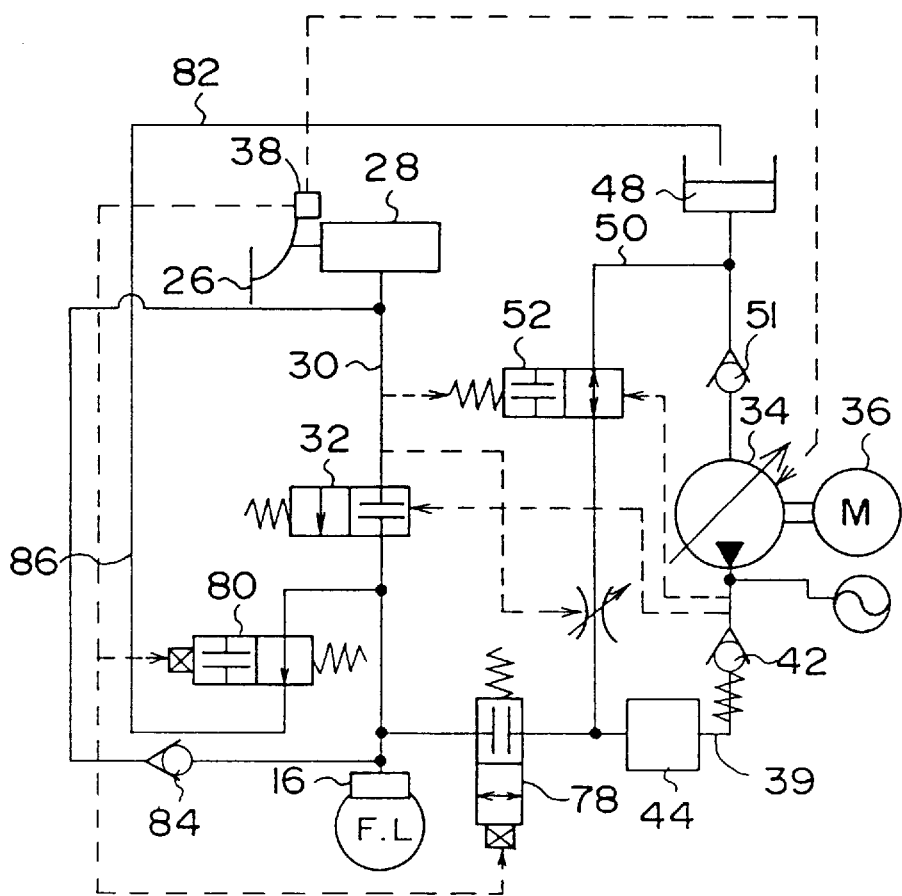
FIG. 24 is a hydraulic circuit diagram of a part of a hydraulic brake system according to a seventh embodiment of the present invention.

A description will now be given, with reference to FIGS. 24, of a seventh embodiment of the present invention. FIG. 24 is a hydraulic circuit diagram of a part of a hydraulic brake system according to the seventh embodiment of the present invention. In FIG. 24, parts that are the same as the parts shown in FIG. 23 are given the same reference numerals, and descriptions thereof will be omitted.

The hydraulic brake system according to the present embodiment has another master cylinder passage 86 parallel to the master cylinder passage 30. The master cylinder passage 86 is provided between the master cylinder 28 and the wheel cylinder 16FL, and has a check valve 84. The check valve 84 is a one-way valve which permits a flow in a direction from the master cylinder 28 to the wheel cylinder 16FL. When the master cylinder pressure which is higher than the wheel cylinder pressure is generated in the master cylinder 28, the pressure in the master cylinder is rapidly introduced into the wheel cylinder 16FL.

In the hydraulic brake system according to the present embodiment, in view of the prevention of brake drag, a structure is used in which the opening/closing valve 78 is provided to prevent an introduction of the brake fluid pressure from the high pressure source passage 39 into the wheel cylinder 16FL when a braking operation is not performed. This structure is effective in terms of preventing brake drag, however, there is a problem in that a delay in a response to a braking operation is possibly generated by the response time of the opening/closing valve 78.

However, in the present embodiment, since the master cylinder pressure is introduced into the wheel cylinder 16FL by providing the master cylinder passage 86, a pressure increasing operation for the wheel cylinder pressure can be started before the opening/closing valve 78 is open. Thus, a brake force can be rapidly increased after a braking operation is started.

Additionally, the hydraulic brake system according to the present embodiment uses a structure in which a brake fluid pressure is introduced from the master cylinder 28 into the wheel cylinder 16FL by opening the opening/closing valve 32 when a malfunction occurs in the variable volume pump 34. In this structure, a delay in a response of the opening/ closing valve 32 may be generated from a time when a malfunction occurs in the variable volume pump 34 until a time when the fail-safe function is effected.

However, in the hydraulic brake system according to the present embodiment, the master cylinder pressure is introduced into the wheel cylinder 16FL immediately after the master cylinder pressure having a higher level that the wheel cylinder pressure is generated even if the opening/closing valve 32 is still closed. Accordingly, the hydraulic brake system according to the present embodiment can achieve a fail-safe mechanism having a quick response without being influenced by the response of the opening/closing valve 32.

The present invention is not limited to the specifically disclosed embodiments, and variations and modifications may be made without departing from the scope of the present invention.

What is claimed is:

1. A hydraulic brake system for generating a brake force by supplying brake fluid to a wheel cylinder under a high pressure generated by a high pressure source, said hydraulic brake system comprising:

a reservoir tank storing the brake fluid under atmospheric pressure;

a fluid passage connecting an outlet of said high pressure source to both of said wheel cylinder and said reservoir tank; and flow control means for controlling an amount of the brake fluid flowing from said high pressure source to said wheel cylinder, wherein when said wheel cylinder pressure is higher than atmospheric pressure and lower than said discharge pressure of the high-pressure source, the outlet of the high-pressure source simultaneously communicates with both the wheel cylinder and the reservoir tank.

2. The hydraulic brake system as claimed in claim 1, further comprising:

brake means for generating a predetermined force corresponding to an operational force applied thereto;

a first opening/closing valve provided in a part of said fluid passage between said high pressure source and said wheel cylinder to close said part of said fluid passage when the operational force applied to said brake means is less than a predetermined value;

a pressure release passage connecting said wheel cylinder to said reservoir tank; and a second opening/closing valve provided in said pressure release passage to open said pressure release passage when the operational force applied to said brake means is less than a predetermined value.

3. The hydraulic brake system as claimed in claim 1, wherein said high pressure source comprises a variable volume pump, and said flow control means comprises variable volume flow control means for controlling an output volume from said variable volume pump.

4. The hydraulic brake system as claimed in claim 1, wherein said fluid passage comprises a high pressure source passage connected to said which pressure source, a wheel cylinder passage connecting said high pressure source passage to said wheel cylinder and a reservoir passage connecting said high pressure source passage to said reservoir tank, and wherein said flow control means comprises a variable throttle provided in said reservoir passage.

5. The hydraulic brake system as claimed in claim 1, further comprising:

a master cylinder generating a fluid pressure corresponding to an operational force applied to a brake;

a master cylinder passage connecting said master cylinder to said wheel cylinder; and an opening/closing valve provided in said master cylinder passage to open said master cylinder passage when the high pressure generated by said high pressure source is less than a predetermined pressure.

6. The hydraulic brake system as claimed in claim 1, further comprising;

a master cylinder generating a fluid pressure corresponding to an operational force applied to a brake;

a master cylinder passage connecting said master cylinder to said wheel cylinder; and a check valve provided in said master cylinder passage to permit a flow of the brake fluid only in a direction from said master cylinder to said wheel cylinder.

7. The hydraulic brake system as claimed in claim 4, further comprising a master cylinder generating a fluid pressure corresponding to an operational force applied to a brake, and wherein said variable throttle comprises a spool valve for decreasing an amount of the brake fluid flowing in said reservoir passage as the fluid pressure generated by said master cylinder is increased.

8. The hydraulic brake system as claimed in claim 4, wherein said variable throttle comprises an effective opening area varied by an external input and adjust means for adjusting said effective opening area based on a predetermined brake force control.

9. The hydraulic brake system as claimed in claim 4, further comprising constant flow means for maintaining a constant flow rate of the brake fluid flowing in said high pressure source passage.

10. The hydraulic brake system as claimed in claim 5, further comprising an opening/closing valve provided in said reservoir passage to close said reservoir passage when the high pressure generated by said high pressure source is less than a predetermined pressure.

11. The hydraulic brake system as claimed in claim 10, further comprising:

a check valve provided in said master cylinder passage to permit a flow of the brake fluid only in a direction from said master cylinder to said wheel cylinder.

12. The hydraulic brake system as claimed in claim 6, further comprising an opening/closing valve provided in said reservoir passage to close said reservoir passage when the high pressure generated by said high pressure source is less than a predetermined pressure.

* * * * *